(12) United States Patent
Peters et al.

(10) Patent No.: US 9,163,644 B2
(45) Date of Patent: Oct. 20, 2015

(54) HYDRAULIC TOOL CONTROL WITH ELECTRONICALLY ADJUSTABLE FLOW

(75) Inventors: Mark Edwin Peters, New London, WI (US); Ross Renner, Black Creek, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1115 days.

(21) Appl. No.: 13/189,394

(22) Filed: Jul. 22, 2011

(65) Prior Publication Data
US 2012/0023921 A1 Feb. 2, 2012

Related U.S. Application Data

(60) Provisional application No. 61/368,375, filed on Jul. 28, 2010, provisional application No. 61/368,362, filed on Jul. 28, 2010, provisional application No. 61/368,369, filed on Jul. 28, 2010, provisional application No. 61/368,383, filed on Jul. 28, 2010.

(51) Int. Cl.
*F15B 11/16* (2006.01)
*B23K 9/10* (2006.01)
(Continued)

(52) U.S. Cl.
CPC ............. *F15B 11/162* (2013.01); *B23K 9/1006* (2013.01); *B23K 9/164* (2013.01); *G01M 3/2815* (2013.01); *F15B 2211/4053* (2013.01); *F15B 2211/426* (2013.01); *F15B 2211/6346* (2013.01); *F15B 2211/665* (2013.01);
(Continued)

(58) Field of Classification Search
CPC ................... F15B 11/16; F15B 11/162; F15B 2211/4053; F15B 2211/6346; F15B 2211/3358; F15B 2211/781

USPC ....................................... 91/516, 536; 60/368
See application file for complete search history.

(56) References Cited

U.S. PATENT DOCUMENTS

| 4,459,806 A | 7/1984 | Falk |
| 4,516,467 A * | 5/1985 | Keeney et al. ................. 91/516 |

(Continued)

FOREIGN PATENT DOCUMENTS

| DE | 19546201 A1 | 6/1996 |
| EP | 0 884 422 A2 | 12/1998 |

(Continued)

OTHER PUBLICATIONS

International Search Report & Written Opinion for application No. PCT/US2011/058950 mailed Feb. 20, 2012.

(Continued)

*Primary Examiner* — F. Daniel Lopez
(74) *Attorney, Agent, or Firm* — Fletcher Yoder P.C.

(57) ABSTRACT

The present disclosure provides embodiments directed towards a system for the control of hydraulic output by a hydraulic power source. In one embodiment, a system is provided. The system includes a hydraulic supply system having a drive, a hydraulic pump coupled to the drive, a first hydraulic output configured to supply a first flow of a hydraulic fluid from the hydraulic pump to a hydraulic lift, a second hydraulic output configured to supply a second flow of the hydraulic fluid from the hydraulic pump to a first hydraulic tool, and a controller configured to adjust a speed of the drive in response to a feedback indicative of a first load by the hydraulic lift, a second load by the first hydraulic tool, or a combination thereof.

17 Claims, 15 Drawing Sheets

(51) Int. Cl.
  *B23K 9/16* (2006.01)
  *G01M 3/28* (2006.01)

(52) U.S. Cl.
  CPC  *F15B 2211/6654* (2013.01); *F15B 2211/6658* (2013.01); *F15B 2211/7135* (2013.01); *F15B 2211/781* (2013.01)

(56) References Cited

U.S. PATENT DOCUMENTS

| | | | |
|---|---|---|---|
| 4,534,707 A | | 8/1985 | Mitchell |
| 4,736,673 A | * | 4/1988 | Harada et al. ............. 91/526 |
| 4,744,218 A | * | 5/1988 | Edwards et al. ............ 60/368 |
| 4,823,551 A | * | 4/1989 | Hehl ........................... 60/368 |
| 5,214,916 A | | 6/1993 | Lukich |
| 5,490,385 A | | 2/1996 | Stoll |
| 5,520,087 A | | 5/1996 | Takamura |
| 5,634,334 A | * | 6/1997 | Hehl ........................... 91/526 |
| 6,023,134 A | | 2/2000 | Carl |
| 6,651,544 B2 | * | 11/2003 | Skinner ....................... 91/361 |
| 6,719,080 B1 | | 4/2004 | Gray, Jr. |
| 7,469,535 B2 | | 12/2008 | Sawada |
| 2002/0083825 A1 | | 7/2002 | Kusuyama |
| 2007/0199440 A1 | * | 8/2007 | Brockman et al. ......... 91/532 |

FOREIGN PATENT DOCUMENTS

| | | |
|---|---|---|
| EP | 1186783 A2 | 3/2002 |
| EP | 2105536 A2 | 9/2009 |
| JP | 62220703 A | 9/1987 |
| JP | 2140332 A | 5/1990 |
| JP | 06081802 A | 3/1994 |
| WO | 03004880 A1 | 1/2003 |
| WO | 2004046561 A1 | 6/2004 |
| WO | 2008150267 A1 | 12/2008 |
| WO | 2009099860 A1 | 8/2009 |
| WO | 2009099910 A1 | 8/2009 |

OTHER PUBLICATIONS

Search Report and Written Opinion for PCT/US2011/045417 issued Sep. 29, 2011.
Search Report and Written Opinion for PCT/US2011/045429 issued Sep. 29, 2011.
Search Report and Written Opinion for PCT/US2011/045420 issued Oct. 7, 2011.
U.S. Appl. No. 13/189,341, filed Jul. 22, 2011, Mark Edwin Peters.
U.S. Appl. No. 13/189,363, filed Jul. 22, 2011, Mark Edwin Peters.
U.S. Appl. No. 13/189,399, filed Jul. 22, 2011, Ross Renner.

* cited by examiner

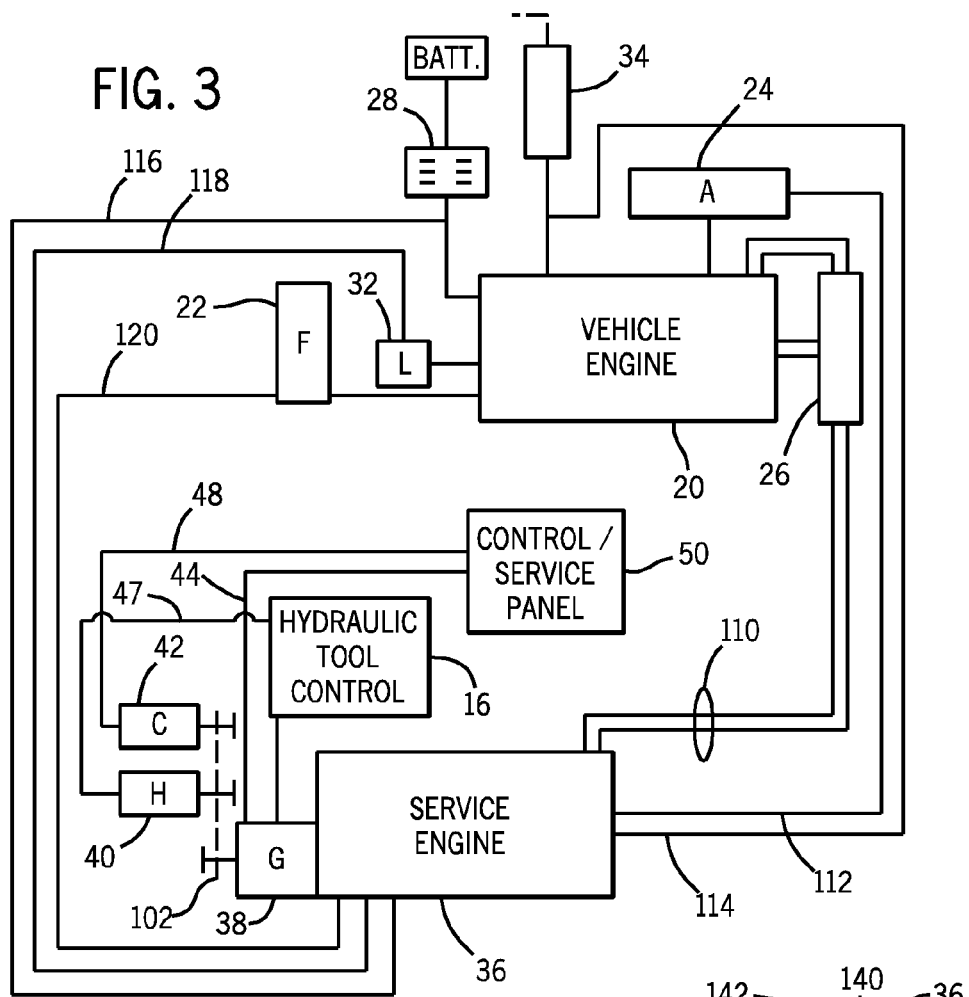
FIG. 3
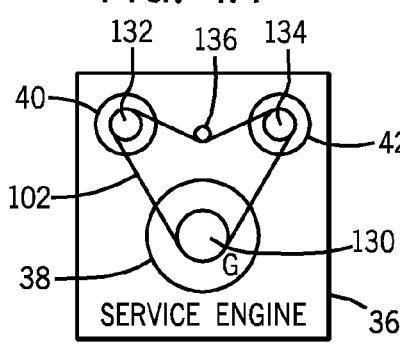
FIG. 4A
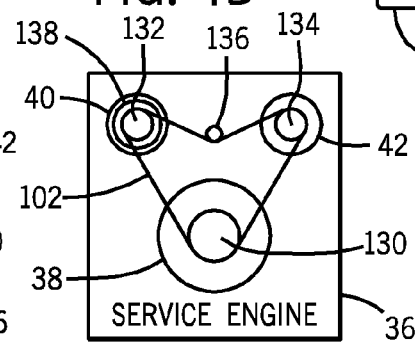
FIG. 4B
FIG. 4C

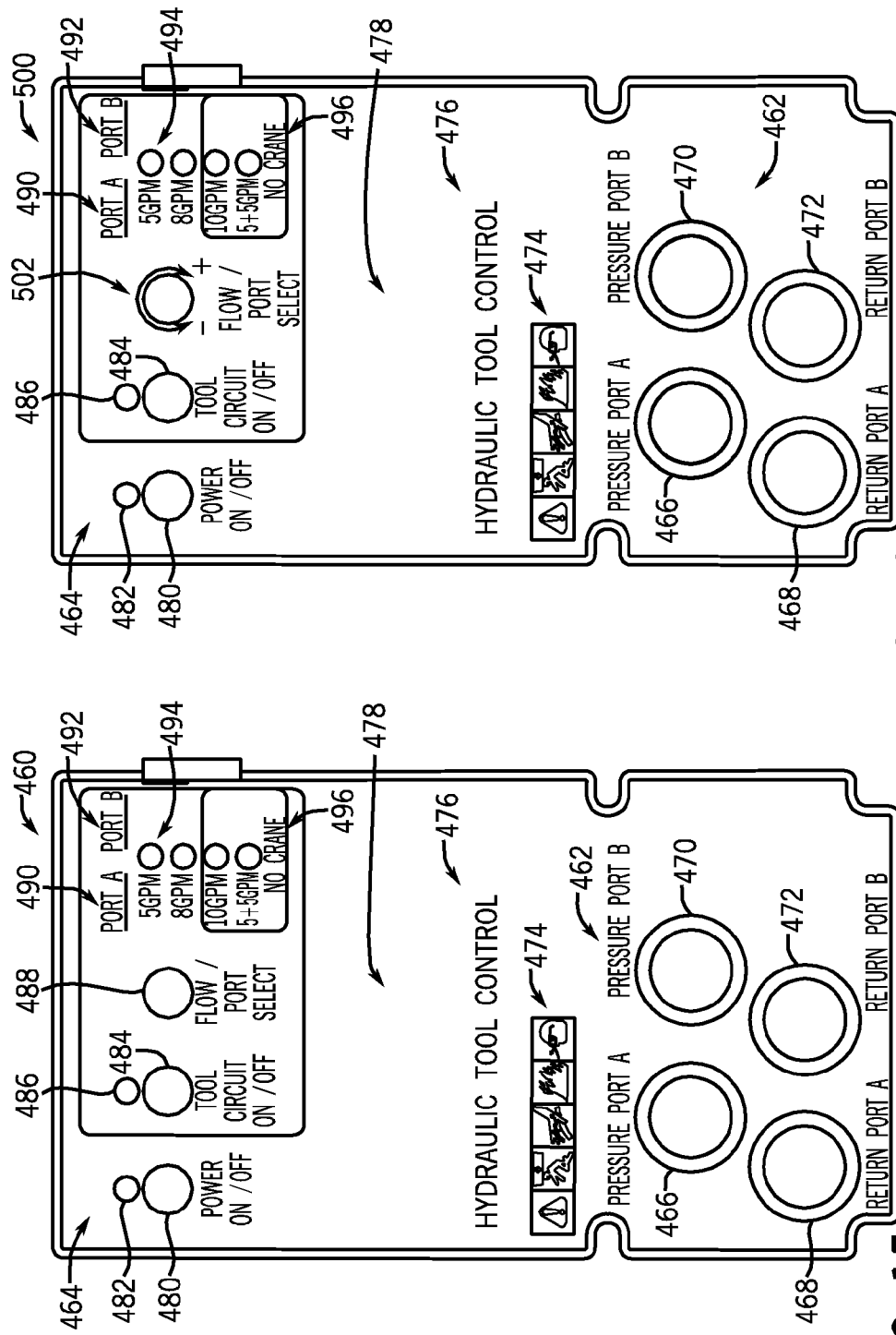

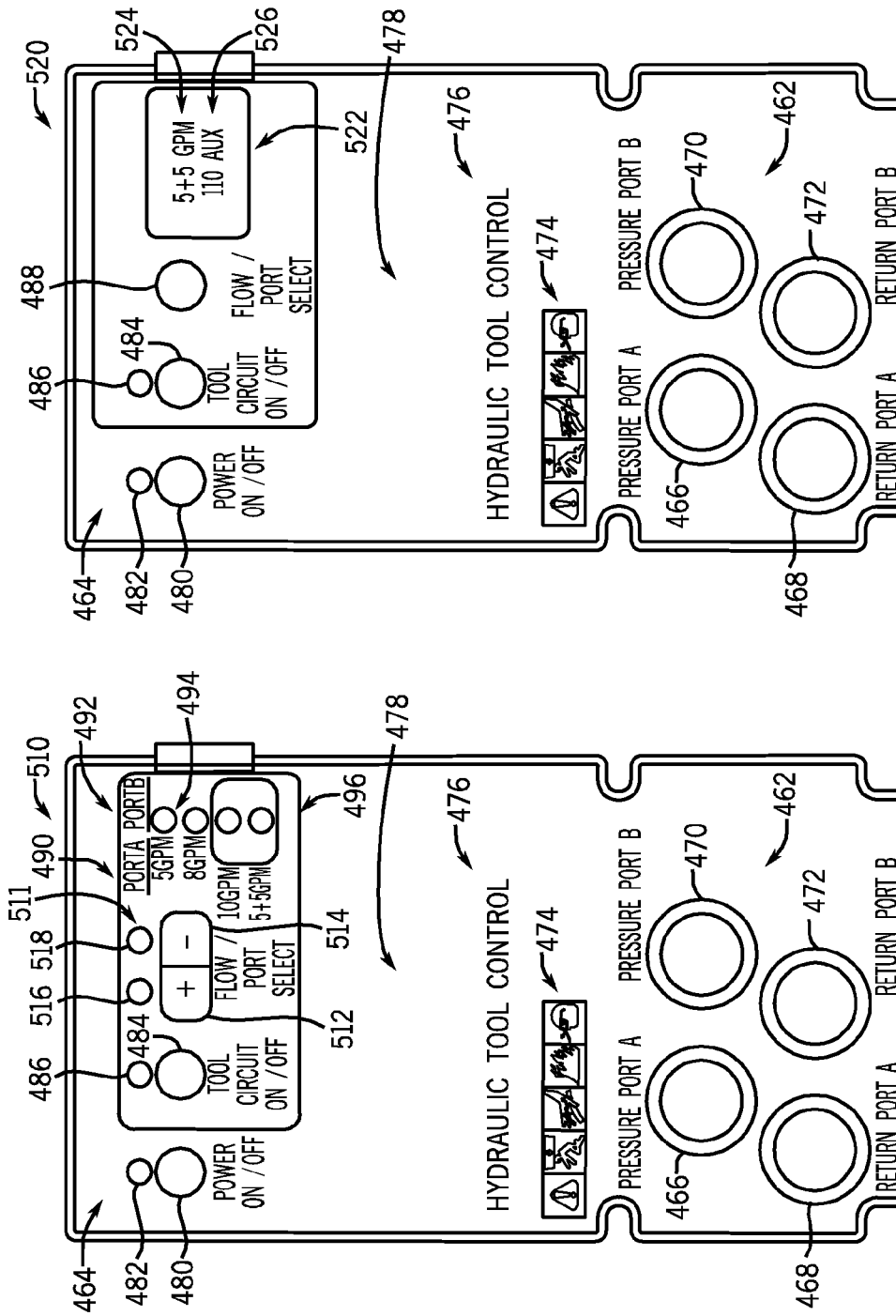

HYDRAULIC TOOL CONTROL WITH ELECTRONICALLY ADJUSTABLE FLOW

CROSS REFERENCE TO RELATED APPLICATIONS

This application claims the benefit of U.S. Provisional Patent Application Ser. No. 61/368,362, entitled "HYDRAULIC TOOL THAT COMMANDS PRIME MOVER OUTPUT," filed on Jul. 28, 2010, U.S. Provisional Patent Application Ser. No. 61/368,369, entitled "HYDRAULIC TOOL THAT SWITCHES OUTPUT," filed on Jul. 28, 2010, U.S. Provisional Patent Application Ser. No. 61/368,375, entitled "HYDRAULIC TOOL CONTROL WITH ELECTRONICALLY ADJUSTABLE FLOW," filed on Jul. 28, 2010, U.S. Provisional Patent Application Ser. No. 61/368,383, entitled "OPERATOR INTERFACE FOR HYDRAULIC TOOL CONTROL," filed on Jul. 28, 2010, all of which are herein incorporated by reference in their entirety.

BACKGROUND

The present embodiments relate generally to power and flow management for an engine and a hydraulic pump used for powering hydraulic loads, such as hydraulic tools and/or cranes. More specifically, the present disclosure relates to the electronic control of engine speed and hydraulic fluid flow in a service pack or other unit capable of providing a flow of hydraulic fluid to hydraulic tools.

Some work vehicles may use one or more hydraulic-powered tools. These tools are powered via one or more pumps driven by an engine, such as the vehicle engine and/or an engine of a service pack. The one or more pumps provide a flow of hydraulic fluid to the hydraulic-powered tools for power. In certain cases, the rate of flow of hydraulic fluid to a tool determines the amount of power available to the tool.

The main vehicle engine, which can power the one or more pumps and, in some configurations, other auxiliary devices, can be a large engine. Large engines are particularly noisy, and can be significantly over powered for certain uses, causing them to be fuel inefficient in some instances. Further, other smaller engines, such as the engine of a service pack, can be fuel inefficient at times. For example, a typical hydraulic system used to power a crane and other hydraulic tools may be powered by an engine. Typically, the hydraulic system uses full hydraulic output at full or idle engine speed, despite the amount of load applied by the user. In such arrangements, there may either be too much power or too little power for the hydraulic tools. When there is too much power, the user must make careful manual adjustments to avoid over-use or over-adjusting of the tool. Additionally, the use of full engine and hydraulic output is often power-inefficient, which can reduce the life of the engine and hydraulic parts. When there is too little power, the user may not be able to utilize the full output of the hydraulic tools, and is only able to use one tool at a time. The careful manual adjustments may be difficult for the user, and can be inaccurate. Moreover, these manual adjustments to the hydraulic system and/or the engines are made at the system. Because some hydraulic tools may be connected to the hydraulic system by long hydraulic lines, this may result in inefficiencies as the user walks back and forth from the work area to the system. Accordingly, there is a need for improved systems for supplying hydraulic output to hydraulic loads, such as a crane and other hydraulic tools.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present embodiments address the above-mentioned and other shortcomings of hydraulic systems by providing embodiments directed towards a method and a system for the electronic and/or automatic adjustment of hydraulic load output. In one embodiment, a system is provided. The system includes a hydraulic supply system having a drive, a hydraulic pump coupled to the drive, a first hydraulic output configured to supply a first flow of a hydraulic fluid from the hydraulic pump to a hydraulic lift, a second hydraulic output configured to supply a second flow of the hydraulic fluid from the hydraulic pump to a first hydraulic tool, and a controller configured to adjust a speed of the drive in response to a feedback indicative of a first load by the hydraulic lift, a second load by the first hydraulic tool, or a combination thereof.

In another embodiment, the present disclosure provides a system having a controller configured to adjust a speed of a drive coupled to a hydraulic pump to change an output of the hydraulic pump. The controller is configured to adjust the speed of the drive in response to a feedback indicative of a first load by a hydraulic lift configured to receive a first flow of hydraulic fluid from the hydraulic pump, a second load by a first hydraulic tool configured to receive a second flow of hydraulic fluid from the hydraulic pump, or a combination thereof.

In another embodiment, the present disclosure provides a system having a service pack unit including a drive, a hydraulic pump coupled to the drive, at least one hydraulic output configured to supply a hydraulic fluid from the hydraulic pump to at least one hydraulic tool, and a controller configured to adjust a speed of the drive in response to a feedback indicative of a load by at least one hydraulic tool and at least one relationship between the speed and the load.

In another embodiment, the present disclosure provides a system, having a hydraulic supply system. The hydraulic supply system includes a drive, a hydraulic pump coupled to the drive, a first hydraulic output configured to supply a first flow of a hydraulic fluid from the hydraulic pump to a hydraulic lift, a second hydraulic output configured to supply a second flow of the hydraulic fluid from the hydraulic pump to a first hydraulic tool, and a controller configured to switch between a first mode and a second mode. The controller is configured to dedicate first and second flow rates to the respective first and second flows in the first mode, and the controller is configured to dedicate third and fourth flow rates to the respective first and second flows in the second mode.

In another embodiment, the present disclosure provides a system having a hydraulic tool control with a hydraulic input configured to couple to a hydraulic pump, a first hydraulic output configured to supply a first flow of a hydraulic fluid from the hydraulic pump to a first hydraulic tool, and a second hydraulic output configured to supply a second flow of the hydraulic fluid from the hydraulic pump to a second hydraulic tool. The hydraulic tool control is configured to dedicate first and second flow rates to the respective first and second flows while the first hydraulic tool is in use.

In another embodiment, the present disclosure provides a system having a hydraulic supply system. The hydraulic supply system includes a drive, a hydraulic pump coupled to the drive, a first hydraulic output configured to supply a first flow of a hydraulic fluid from the hydraulic pump to a first hydraulic tool, a second hydraulic output configured to supply a second flow of the hydraulic fluid from the hydraulic pump to a second hydraulic tool, and a controller configured to dedicate first and second flow rates to the respective first and second flows while the first hydraulic tool is in use, and the controller is configured to supplement the second flow while the first hydraulic tool is not in use.

In another embodiment, the present disclosure provides a system having a hydraulic supply system. The hydraulic supply system includes a drive, a hydraulic pump coupled to the drive, a first hydraulic output configured to supply a first flow of a hydraulic fluid from the hydraulic pump, through a first electronically actuated valve, and to a hydraulic lift, and a second hydraulic output configured to supply a second flow of the hydraulic fluid from the hydraulic pump, through a second electronically actuated valve, and to a first hydraulic tool. The hydraulic supply system is configured to electronically adjust the first and second electronically actuated valves to adjust a first flow rate of the first flow and a second flow rate of the second flow.

In another embodiment, the present disclosure provides a system having a service pack unit. The service pack unit includes a drive, a hydraulic pump coupled to the drive, a first hydraulic output configured to supply a first flow of a hydraulic fluid from the hydraulic pump to a first hydraulic tool, a second hydraulic output configured to supply a second flow of the hydraulic fluid from the hydraulic pump to a second hydraulic tool, and a hydraulic tool control comprising a controller coupled to at least one electronically actuated valve, wherein the controller is configured to electronically adjust at least one electronically actuated valve to adjust a first flow rate of the first flow or a second flow rate of the second flow.

In another embodiment, the present disclosure provides a system having a hydraulic tool control including a hydraulic input configured to couple to a hydraulic pump, a first hydraulic output configured to supply a first flow of a hydraulic fluid from the hydraulic pump, through a first electronically actuated valve, and to a first hydraulic tool. The hydraulic tool control also includes a second hydraulic output configured to supply a second flow of the hydraulic fluid from the hydraulic pump, through a second electronically actuated valve, and to a second hydraulic tool. The hydraulic tool control is configured to electronically adjust the first and second electronically actuated valves to adjust a first flow rate of the first flow and a second flow rate of the second flow.

In another embodiment, the present disclosure provides a system having a service pack unit. The service pack unit includes a drive, a hydraulic pump coupled to the drive, a first hydraulic output configured to supply a first flow of a hydraulic fluid from the hydraulic pump to a first hydraulic tool, a second hydraulic output configured to supply a second flow of the hydraulic fluid from the hydraulic pump to a second hydraulic tool, and a hydraulic tool control having at least one electronically actuated valve. The hydraulic tool control is configured to electronically adjust at least one electronically actuated valve to adjust a first flow rate of the first flow or a second flow rate of the second flow.

In another embodiment, the present disclosure provides a system having a hydraulic supply system. The hydraulic supply system includes a drive, a hydraulic pump coupled to the drive, a first hydraulic output configured to supply a first flow of a hydraulic fluid from the hydraulic pump to a hydraulic lift, a second hydraulic output configured to supply a second flow of the hydraulic fluid from the hydraulic pump to a first hydraulic tool, and a hydraulic tool control having an electronic user interface, a controller coupled to the electronic user interface, and at least one electronically actuated valve coupled to the controller, wherein the electronic user interface has a display and an input device.

In another embodiment, the present disclosure provides a system having a hydraulic tool control including a hydraulic input configured to couple to a hydraulic pump, a first hydraulic output configured to supply a first flow of a hydraulic fluid from the hydraulic pump to a first hydraulic tool, a second hydraulic output configured to supply a second flow of the hydraulic fluid from the hydraulic pump to a second hydraulic tool, an electronic user interface having a display and an input device, and at least one electronically actuated valve configured to adjust a first flow rate of the first flow or a second flow rate of the second flow. The input device is configured to enable the user to electronically adjust a valve position of at least one electronically actuated valve.

In another embodiment, the present disclosure provides a system having a service pack unit, including a drive, a hydraulic pump coupled to the drive, a first hydraulic output configured to supply a first flow of a hydraulic fluid from the hydraulic pump to a first hydraulic tool, a second hydraulic output configured to supply a second flow of the hydraulic fluid from the hydraulic pump to a second hydraulic tool, and a hydraulic tool control having at least one electronically actuated valve and an electronic user interface having a display and an input device. The electronic user interface is configured to electronically adjust at least one electronically actuated valve to switch between a plurality of flow rates of the first and second flows.

DRAWINGS

These and other features, aspects, and advantages of the present invention will become better understood when the following detailed description is read with reference to the accompanying drawings in which like characters represent like parts throughout the drawings, wherein:

FIG. 3 is a diagram of an embodiment of power systems in the vehicle of FIG. 1, illustrating support systems of the service pack integrated with support systems of the vehicle engine;

FIGS. 4A-4C are diagrams of embodiments of the service pack with different arrangements of a generator, a hydraulic pump, and an air compressor driven by a service pack engine in accordance with the present disclosure;

FIG. 15 is a front view of an embodiment of a faceplate for use in conjunction with a hydraulic tool control, the faceplate having connection covers, various indicators for indicating operational modes, and electronic controls that enable a user to electronically switch between the various operational modes of the hydraulic tool control in accordance with the present disclosure;

FIG. 16 is a front view of an embodiment of a faceplate for use in conjunction with a hydraulic tool control, the faceplate having connection covers, various indicators for indicating operational modes, and electronic controls that enable a user to electronically switch between the various operational modes of the hydraulic tool control in accordance with the present disclosure;

FIG. 17 is a front view of an embodiment of a faceplate for use in conjunction with a hydraulic tool control, the faceplate having connection covers, various indicators for indicating operational modes, and electronic controls that enable a user to electronically switch between the various operational modes of the hydraulic tool control in accordance with the present disclosure;

Figure 19:
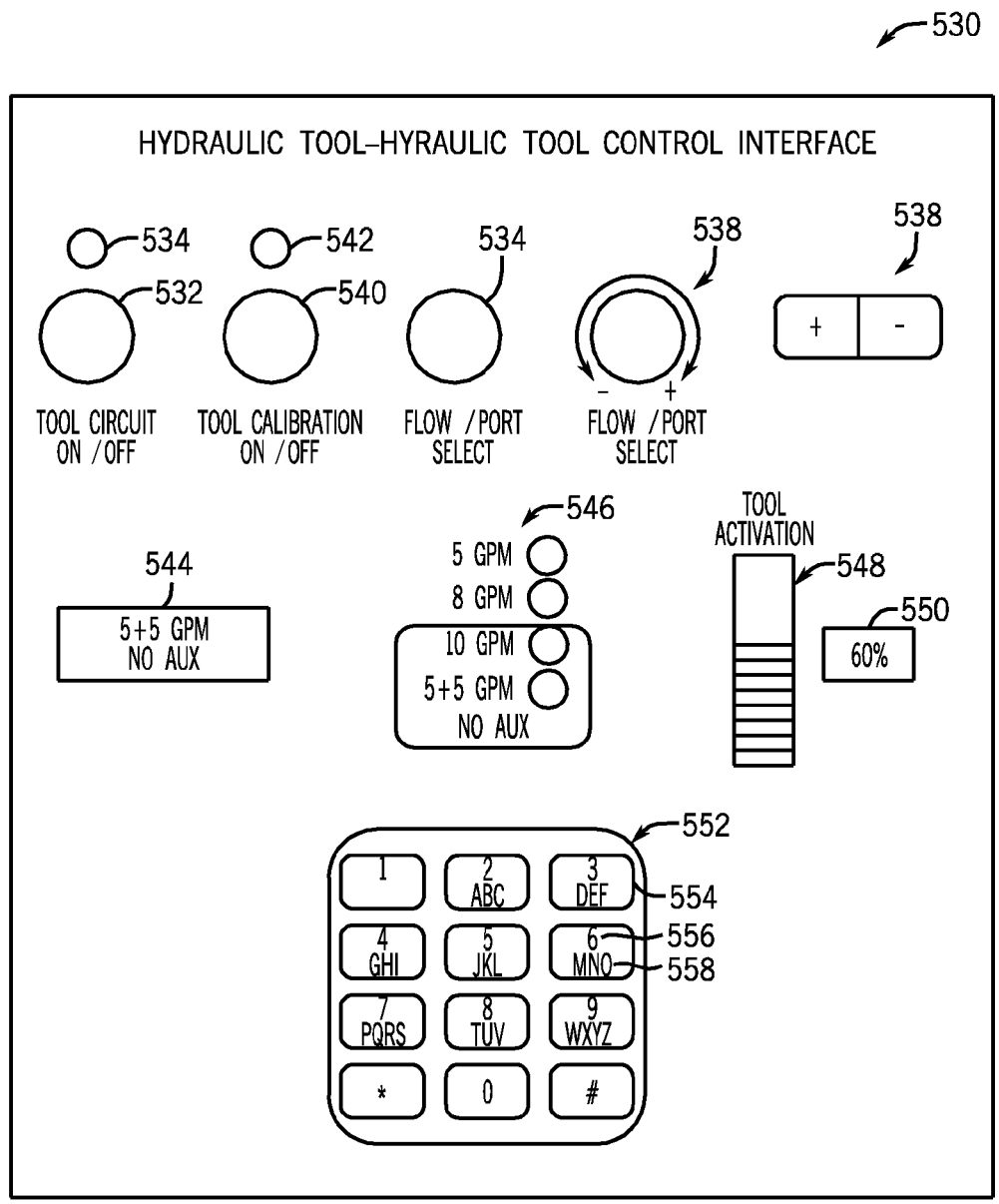

FIG. 18 is a front view of an embodiment of a faceplate for use in conjunction with a hydraulic tool control, the faceplate having connection covers, various indicators for indicating operational modes, and electronic controls that enable a user to electronically switch between the various operational modes of the hydraulic tool control in accordance with the present disclosure; and FIG. 19 is a front view of an embodiment of a user interface for use in conjunction with a hydraulic tool and a hydraulic tool control operatively connected to the hydraulic tool, the user interface having various indicators for indicating operational modes of the hydraulic tool control, and electronic controls that enable a user to electronically switch between the various operational modes of the hydraulic tool control in accordance with the present disclosure.

DETAILED DESCRIPTION

As discussed below, the present disclosure provides a uniquely effective solution to the control of hydraulic output in various applications. Thus, the disclosed embodiments relate or deal with any application where a prime mover or power source that is engine driven intermittently powers a hydraulic load or a combination of hydraulic loads. In certain embodiments, the disclosed hydraulic output control techniques may be used with various service packs and/or hydraulic pumps to prevent unnecessary or wasteful use of (and exhaust emissions by) a power source that is coupled to multiple loads, specifically one or more hydraulic loads. The present disclosure also provides embodiments that allow the use of multiple hydraulic tools simultaneously. For example, the disclosed embodiments may be used in combination with any and all of the embodiments set forth in U.S. application Ser. No. 11/742,399, filed on Apr. 30, 2007, and entitled "ENGINE-DRIVEN AIR COMPRESSOR/GENERATOR LOAD PRIORITY CONTROL SYSTEM AND METHOD," which is hereby incorporated by reference in its entirety. By further example, the disclosed embodiments may be used in combination with any and all of the embodiments set forth in U.S. application Ser. No. 11/943,564, filed on Nov. 20, 2007, and entitled "AUXILIARY SERVICE PACK FOR A WORK VEHICLE," which is hereby incorporated by reference in its entirety.

As discussed below, the present embodiments may utilize any one or a combination of user input, hydraulic load sensing, load sensing from the activation of a trigger, or any load sensing to determine an amount of hydraulic output suitable for a given task. The hydraulic output may be controlled by a hydraulic tool control (HTC), which can interface with or include a controller for adjusting the speed of an engine driving one or more hydraulic pumps. Additionally or alternatively, a user may select from various flow schemes for the HTC, such as certain flow modes that determine the flow rate of hydraulic fluid delivered to one or more hydraulic tools. The user may perform this selection manually on an electronic interface of the HTC, or the selection may be performed automatically by a controller, integrated with or otherwise operatively coupled to the HTC, via load sensing. Depending on the flow scheme that is selected, the HTC may provide a hydraulic output to one hydraulic load, such as a crane or impact wrench, or may provide a usable hydraulic output to multiple hydraulic loads, such as the crane and the impact wrench, or the impact wrench and another hydraulic tool. Further, the HTC may automatically select a suitable amount of hydraulic output depending on an amount of hydraulic load demanded by each tool. For example, the HTC may substantially match the hydraulic output (e.g., supply) to the hydraulic demand by one or more hydraulic tools, e.g., based on various sensor feedback indicative of the load (i.e., a load sense). In particular, the HTC may adjust the engine speed, e.g., via electronic control, continuously or incrementally in proportion to the demand for hydraulic power by one or more hydraulic tools, thereby reducing the possibility of the engine running too fast or too slow for the particular hydraulic demand. To allow the HTC to perform such tasks, the system having the HTC may include a service pack having an engine. The engine is generally coupled to a hydraulic pump, which provides the flow of hydraulic fluid to the hydraulic tools.

Figure 1:
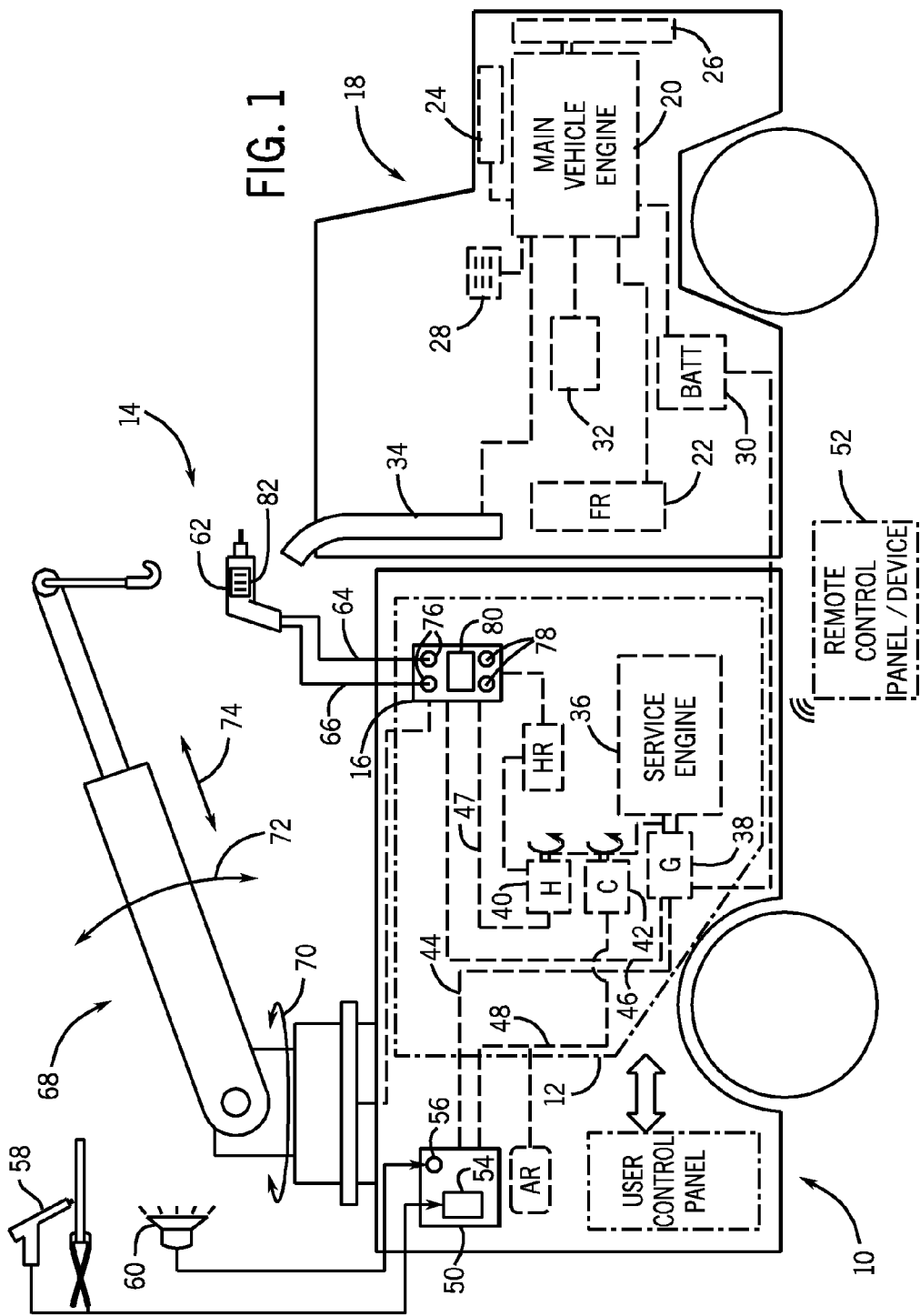
FIG. 1 is a diagram of an embodiment of a work vehicle having a service pack with a hydraulic power source integrated with a hydraulic tool control in accordance with the present embodiments.

Keeping in mind that the present embodiments relate to hydraulic output for a variety of different hydraulic systems, the present disclosure will discuss the present embodiments in the context of a service pack integral with or mounted to a work vehicle. One embodiment of such a work vehicle 10 is depicted in FIG. 1. The work vehicle 10 is shown as a work truck, although the work vehicle 10 may have any other suitable configuration. In the illustrated embodiment, the vehicle 10 includes a service pack 12 for supplying various services (e.g., electrical, compressed air, and hydraulic power) to a range of applications 14. As discussed in further detail below, the service pack 12 includes a hydraulic tool control (HTC) 16 configured to control hydraulic output to one or more hydraulic loads. The vehicle 10 has a main vehicle power plant 18 based around a vehicle engine 20. The main vehicle engine 20 may include a spark ignition engine (e.g., gasoline fueled internal combustion engine) or a compression ignition engine (e.g., a diesel fueled engine).

The vehicle power plant 18 includes a number of support systems. For example, the engine 20 consumes fuel from a fuel reservoir 22, e.g., one or more liquid fuel tanks. An air intake or air cleaning system 24 supplies air to engine 20, which may, in some applications, be turbo charged or super charged. A cooling system 26, e.g., a radiator, circulation pump, a thermostat-controlled valve and a fan, provides for cooling the engine 20. The vehicle power plant 18 also includes an electrical system 28, which may include an alternator or generator, along with one or more system batteries 30. The vehicle power plant 18 also includes a lube oil system 32 and an exhaust system 34.

The service pack 12 may include one or more service systems driven by a service engine 36. Generally, the service pack 12 provides electrical power, hydraulic power, and compressed air for the applications 14. In the diagrammatical representation of FIG. 1, for example, the service engine 36 drives a generator 38 as well as a hydraulic pump 40 and air compressor 42. The hydraulic pump 40 may be based on any suitable technology, such as piston pumps, gear pumps, vane pumps, with or without closed-loop control of pressure and/or flow. In certain embodiments, the pump 40 may include a constant displacement pump, a variable displacement pump, a plurality of pumps in a parallel or series configuration, or a combination thereof. As discussed in detail below, the HTC 16, which may be in communication with the service pack 12, may monitor the application of hydraulic loads (e.g., via trigger position, pressure drops, or the like). In response to the load, the HTC 16 may adjust the output of the main vehicle engine 20, the service engine 36, and/or the hydraulic pump 40. For example, in order to provide sufficient power and/or control for an applied hydraulic load, the HTC 16, in some embodiments, functions to adjust the speed of the engine 20, the engine 36, and/or the position of one or more valves that control the level of output of the hydraulic pump 40 to a plurality of hydraulic tools.

Like the hydraulic pump 40, the generator 38 may be directly driven by the engine 36 rather than engine 20. For example, the generator 38 may be close coupled to the engine 36, or may be belt or chain driven, where desired. The air compressor 42 may be of any suitable type, such as a rotary screw air compressor or a reciprocating piston air compressor. Of course, the systems of the service pack 12 include appropriate conduits, wiring, tubing and so forth for conveying the service generated by these components to an access point, and for control by a control system. Convenient access points will be located around the periphery of the vehicle, such as access to the HTC 16 that enables a user to easily make changes to hydraulic output as desired. In one embodiment, the generator and compressor services may be routed to a common access point, while the hydraulic service is routed through the HTC 16. For example, the diagrammatical view of FIG. 1 illustrates the generator 38 as coupled to electrical cabling 44 (for AC power supply) and 46 (for 12 volt DC power supply). The hydraulic pump 40 is coupled to hydraulic circuit 47 and the air compressor 42 is coupled to an air circuit 48.

As represented generally in FIG. 1, the generator 38 is also coupled to the vehicle electrical system, and particularly to the vehicle battery 30. Thus, not only may the service pack 12 allow for 12 volt loads to be powered without operation of the main vehicle engine 20, but the vehicle battery 30 may serve as a shared battery, and is maintained in a state of charge by the service pack 12 generator output. In certain embodiments, a control system may monitor the level of charge of the vehicle battery 30 to ensure substantially continuous operation of the HTC 16, monitoring of applied loads, power consumption, and so forth.

The cabling and conduits 44, 46, 47, 48 may, as in the illustrated embodiment, route service for all of these systems directly from connections on the service pack 12. Accordingly, certain control functions, such as control of certain compressor and/or generator operations, may be available from a control and service panel 50. The panel 50 may also enable certain engine parameters to be monitored, such as the speed of the service engine 36, the speed of the vehicle engine 20, the output of the generator 38 and/or compressor 42, and so on. The service panel 50 may be located on any surface of the vehicle 10, or on multiple locations in the vehicle 10. The control and access panel 50, in some embodiments, may be in communication with the HTC 16. In a similar manner to the circuits 44, 46, and 48, the hydraulic circuit 47 is routed to the HTC 16. The HTC 16 enables functions of the hydraulic system to be controlled and, in certain embodiments, monitored. The HTC 16, as depicted, may also be located on any surface of the vehicle 10, though it may be desirable to place the HTC 16 in a location that enables easy adjustment of hydraulic flow parameters and facile connection/disconnection of hydraulic tools and/or hoses.

As also illustrated in FIG. 1, a remote control panel or device 52 may also be provided that may communicate with the control panel 50, with the HTC 16, and/or directly with the service pack 12 via cabling or wirelessly. In a manner similar to conventional controls, then, the operator may control or activate hydraulic, compressor, and/or generator output without directly accessing either the components within the service pack enclosure or the control panel 50. Additionally or alternatively, as described below, certain of the hydraulic tools may be integrated with a user interface that allows specific control over the operation of the HTC 16.

As noted above, any desired location may be selected as a convenient access point for one or more of the systems of the service pack 12. In the illustrated embodiment, for example, one or more alternating current electrical outputs, which may take the form of electrical receptacles 54 (for AC power) and 56 (for 12 volt DC power) are provided at the panel 50. Similarly, one or more pneumatic connections, typically in the form of a quick disconnect fitting, may be provided.

In the embodiment illustrated in FIG. 1, electrical applications may be coupled to the service pack 12 by interfacing with the outputs provided by receptacle 54. For example, a portable welder 58 may be coupled to the AC electrical output 54, and may provide constant current or constant voltage-regulated power suitable for a welding application. Similarly, DC loads may be coupled to the DC receptacle 56. Such loads may include lights 60, or any other loads that would otherwise be powered by operation of the main vehicle engine 20. As mentioned above, the 12 volt DC output of the service pack 12 also serves to maintain the charge of the vehicle battery 30, and to power any ancillary loads that the operator may need during work (e.g., cab lights, the HTC 16, control system and load monitors, etc.).

The hydraulic applications, as noted above, are coupled to the HTC 16 as illustrated in FIG. 1. For example, a hydraulic load, illustrated as a handheld hydraulic drill 62, may be coupled to the HTC 16 by appropriate hoses or conduits 64, 66. For example, one of the hoses 64 may provide a feed of hydraulic fluid while the other hose 66 may return the hydraulic fluid to the HTC 16 from the hydraulic drill 62. Additionally, certain of the hydraulic applications illustrated diagrammatically in FIG. 1 may be incorporated into the work vehicle 10 and coupled to the HTC 16. For example, the illustrated work vehicle 10 includes a hydraulic lift, illustrated as a crane 68, which can be coupled to the HTC 16 and driven separately from the main vehicle engine 20. The crane 68 may include a variety of control features that enable the crane 68 to be moved in a variety of directions, illustrated diagrammatically as arrows 70, 72, 74. In certain operational modes, the HTC 16 is configured such that the crane 68 and the hydraulic drill 62 may be operated simultaneously. Additionally or alternatively, the HTC 16 is configured to selectively adjust the amount of hydraulic power provided to each based on feedback indicative of a load.

In addition to providing receptacles 76 for connecting to various hydraulic tools, the HTC 16 also includes one or more user-accessible adjustment features 78 for switching between various operational modes of the HTC 16, for example to allow the simultaneous use of multiple hydraulic tools. As an example, the adjustment features 78 may be push buttons, dials, switches, a keypad, a touch screen, or any similar electronic-based user interface. The HTC 16 may also include a user-perceivable indicator 80 for indicating the mode of operation of the HTC 16, such as substantially real-time hydraulic flow rates, activated tools, or the like. The user-perceivable indicator 80 may include a visual indication such as a light emitting diode (LED) readout, a series of LED lights proximate one or more text or symbolic indicia, a display, an liquid crystal display (LCD) screen, a touch screen, or a meter, among others. In certain embodiments, the user-perceivable indicator 80 may also provide auditory alerts to the user via one or more speakers. As an example, the auditory alerts may sound in conjunction with mode switching (automatic or manual mode switches), errors, power on, power off, or similar operational occurrences. Such auditory alerts may be desirable in situations where the operational mode of the HTC 16 is switched automatically, or via a user interface 82 on the hydraulic tool 62. In certain embodiments, the user interface 82 may be a part of the HTC 16, or include similar functions to those of a control panel on the HTC 16. The operation of the HTC 16 and various user interfaces are discussed in further detail below.

In use, the service pack 12 may provide power for the on-site applications 14 substantially separately from the vehicle engine 20. That is, the service engine 36 generally may not be powered during transit of the vehicle 10 from one service location to another, or from a service garage or facility to a service site. Once located at the service site, the vehicle 10 may be parked at a convenient location, and the main engine 20 may be shut down. The service engine 36 may then be powered to provide service from one or more of the service systems (e.g., generator 38, hydraulic pump 40, and air compressor 42) described above. The service pack 12 also may include clutches, or other mechanical engagement devices, for selective engagement and disengagement of one or more of the generator 38, the hydraulic pump 40, and the air compressor 42, alone or in combination with one another.

Figure 2:
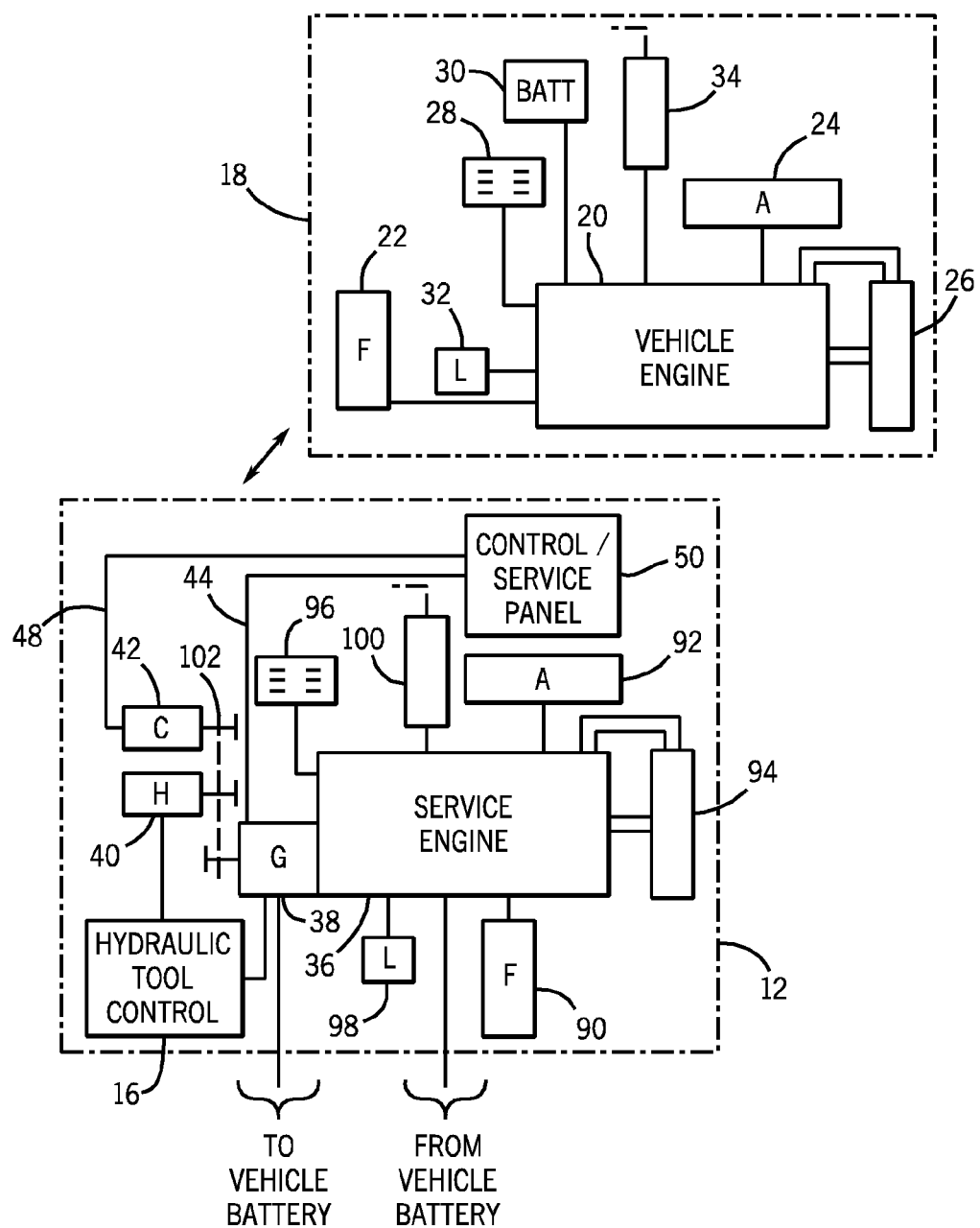
FIG. 2 is a diagram of an embodiment of power systems in the vehicle of FIG. 1, illustrating support systems of the service pack separate and independent from support systems of a vehicle engine.

Several different scenarios may be envisaged for driving the components of the service pack 12, and for integrating or separating the support systems of the service pack 12 from those of the vehicle power plant 18. One such approach is illustrated in FIG. 2, in which the service pack 12 is independent and operates separately from the vehicle power plant 18. In the embodiment illustrated in FIG. 2, as shown diagrammatically, the support systems for the vehicle power plant 18 are coupled to the vehicle engine 20 in the manner set forth above. The service pack 12 reproduces some or all of these support systems for operation of the service engine 36. In the illustrated embodiment, for example, these support systems include a separate fuel reservoir 90, a separate air cleaner system 92, a separate cooling system 94, a separate electrical protection and distribution system 96, a separate lube oil system 98, where desired for the engine, and a separate exhaust system 100.

Many or all of these support systems may be provided local to the service engine 36, that is, at the location where the service engine 36 is supported on the vehicle 10. On larger work vehicles, access to the location of the service engine 36 and the service pack 12 in general, may be facilitated by the relatively elevated clearance of the vehicle 10 over the ground. Accordingly, components such as the fuel reservoir, air cleaner, cooling system radiator, electrical fuse box, and so forth may be conveniently positioned so that these components can be readily serviced. Also, in the illustrated embodiment, the hydraulic pump 40 and air compressor 42 are illustrated as being driven by a shaft extending from the generator 38, such as by one or more belts, chains, or other features for power transmission 102. As noted above, one or both of these components, or the generator 38 may be provided with a clutch or other mechanical disconnect to allow them to idle while other systems of the service pack are operative.

FIG. 3 represents an embodiment of a configuration in which the service pack support systems are highly integrated with those of the main vehicle power plant 18. In the illustration of FIG. 3, for example, all of the systems described above may be at least partially integrated with those of the vehicle power plant 18. Thus, coolant lines 110 of the service engine 36 are routed to and from the vehicle cooling system 26, while an air supply conduit 112 of the service engine 36 is routed from the air intake or cleaner 24 of the vehicle engine 20. Similarly, an exhaust conduit 114 routes exhaust from the service engine 36 to the exhaust system 34 of the vehicle engine 20. The embodiment of FIG. 3 also illustrates integration of the electrical systems of the vehicle 10 and the service pack 12, as indicated generally by the electrical cabling 116, which routes electrical power of the service engine 32 to the distribution system 28 of the vehicle. The systems may also integrate lube oil functions, such that lubricating oil may be extracted from both crank cases in common, to be cleaned and cooled, as indicated by conduit 118. Finally, a fuel conduit 120 may draw fuel from the main reservoir 22 of the vehicle, or from multiple reservoirs where such multiple reservoirs are present on the vehicle.

In some embodiments, integrated systems of particular interest include electrical and fuel systems. For example, while the generator 38 of the service pack 12 may provide 110 volt AC power for certain applications, its ability to provide 12 volt DC output is particularly attractive to supplement the charge on the vehicle batteries, for charging other batteries, and so forth. The provision of both power types, however, makes the system even more versatile, enabling 110 volt AC loads to be powered (e.g., for tools, welders, etc.) as well as 12 volt DC loads (e.g., external battery chargers, portable or cab-mounted heaters or air conditioners, etc.).

In certain embodiments, a system may include an integration solution between those shown in FIG. 2 and FIG. 3. For example, some of the support systems may be best separated in the vehicle 10 both for functional and mechanical or flow reasons. The disclosed embodiments thus contemplate various solutions between those shown in FIG. 2 and FIG. 3, as well as some degree of elimination of redundancy between these systems. In a presently contemplated embodiment, at least some of the support systems for the primary vehicle engine 20 are used to support the service pack 12 power plant. For example, at least the fuel supply and electrical systems can be at least partially integrated to reduce the redundancy of these systems. The electrical system may thus provide certain support functions when the vehicle engine is turned off, removing dependency from the electrical system, or charging the vehicle batteries 30. Similarly, heating, ventilating and air conditioning systems may be supported by the service pack engine 36, such as to provide heating of the vehicle cab when the primary engine 20 is turned off. Thus, more or less integration and removal of redundancy is possible. In this way, it should be noted that the hydraulic tool control embodiments described herein may be at least partially integrated with the vehicle. For example, hydraulic output control may be done through monitoring a hydraulic load signal, or as a direct communication of the hydraulic load through a controller area network (CAN) bus within the vehicle. As such, the methods of output control as described herein may also include varying the vehicle engine 20 in addition to or in lieu of the service engine 36. For example, in embodiments where many hydraulic loads are being applied to the service engine 36, the HTC 16 or a similar control feature may allow the vehicle engine 20 to provide additional power to avoid or at least mitigate the possibility of engine overload.

The foregoing service pack systems may also be integrated in any suitable manner for driving the service components, particularly the generator 38, hydraulic pump 40, and air compressor 42, and particularly for powering the on-board electrical system, including a control system or similar feature. FIGS. 4A-4C illustrate diagrams of certain implementations for driving these components from the service engine 36. In the embodiment illustrated in FIG. 4A, the generator 38 may be close-coupled to the output of the engine 36, such as directly to the engine fly wheel or to a shaft extending from the engine 36. A sheave 130 is mounted to an output shaft extending from the generator, and similar sheaves 132 and 134 are coupled to the hydraulic pump 40 and air compressor 42, respectively. One or more belts 102 and/or clutches are drivingly coupled between these components, and an idler 136 may be provided for maintaining tension on the belt 102. Such an arrangement is shown in FIG. 4B, in which the hydraulic pump 40 is driven through a clutch 138, such as an electric clutch. It should be noted that any one of the components may be similarly clutched to allow for separate control of the components. Such control may be useful for controlling the power draw on or the output by the engine 36, for example when no load is drawn from the particular component over a period of time, and when the component is not needed for support of the main vehicle engine systems (e.g., maintaining a charge on the vehicle batteries).

These components may be supported in any suitable manner, and may typically include some sort of rotating or adjustable mount such that the components may be swung into and out of tight engagement with the belt to maintain the proper torque-carrying tension on the belt and avoid slippage. Other arrangements, such as chain drives, may also be envisaged. In other arrangements, one or more of the components may be gear driven, with gearing providing any required increase or decrease in rotational speed from the output speed of the engine 36, such as when the HTC 16 or other control feature adjusts the speed of the engine 36 in response to an applied hydraulic load. In FIG. 4C, a support adapter 140 mounts the generator 38 on the service engine 36, and the hydraulic pump 40 and air compressor 42 are driven by a gear reducer 142.

The particular component or components that are directly and/or indirectly driven by the engine 36 may be selected based upon the component and engine specifications. For example, it may be desirable to directly drive the hydraulic pump 40, and to drive the generator 38 via a belt or gear arrangement, permitting the engine 36 to operate at a higher speed (e.g., above 3000 RPM) while allowing a reduced speed to drive the generator or to allow a relatively low hydraulic output (e.g., 1800 RPM).

Figure 5:
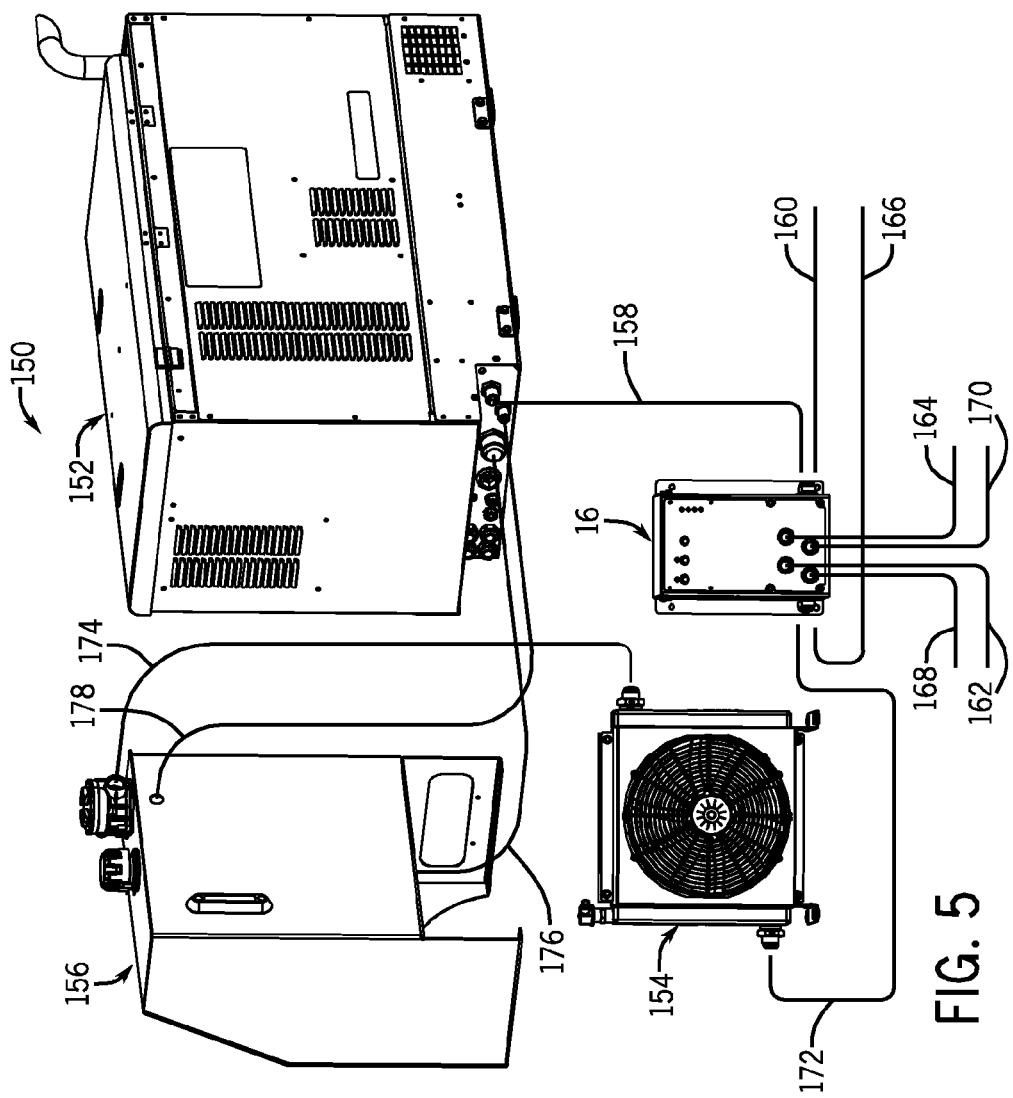
FIG. 5 is an illustration of an embodiment of the service pack of FIG. 1 in operative connection with a hydraulic reservoir and hydraulic tool control in accordance with the present disclosure.

As noted above, the present disclosure is directed towards the HTC 16, which enables the simultaneous use of multiple hydraulic tools, provides an electronic interface for the user, and also adjusts hydraulic output and/or engine speed in response to hydraulic loads. For example, the HTC 16 may be a part of a hydraulic system that is connected to an engine or other prime mover for power, as discussed above. An embodiment of such a hydraulic system 150 is illustrated with respect to FIG. 5. The illustrated hydraulic system 150 includes various features as exploded away from one another and separate from a service vehicle. The system 150 includes one embodiment of a service pack 152, which corresponds to the service pack 12 discussed above with respect to FIGS. 1-4C. The service pack 152 includes at least one hydraulic pump, and is illustrated as operatively connected to one embodiment of the HTC 16, which is also connected to a heat exchanger 154, hydraulic tools, and a hydraulic fluid reservoir 156. The various connection ports of the HTC 16, which provide an interface between each hydraulic line connected to the HTC 16, are discussed below with respect to FIG. 6.

In the illustrated embodiment, the service pack 152, which includes the one or more hydraulic pumps, is configured to provide at least one flow of hydraulic fluid to the HTC 16 via a first hydraulic line 158. The HTC 16, as will be discussed in further detail below with respect to FIGS. 6-9, is configured to distribute the main flow of hydraulic fluid to a plurality of hydraulic tools via a plurality of hydraulic lines. Specifically, in the illustrated embodiment, the HTC 16 is configured to provide a first flow to a hydraulic lift, such as the crane 68 of FIG. 1, via an auxiliary hydraulic line 160. The HTC 16 is also configured to provide a flow of hydraulic fluid to primary and secondary hydraulic tools via primary and secondary hydraulic lines 162, 164, respectively.

Each hydraulic tool receives its respective hydraulic flow and is configured to use the pressurized hydraulic fluid to perform work. The spent hydraulic fluid that results is eventually provided back to the service pack 152 for re-pressurization. Essentially, each hydraulic tool acts as a hydraulic circuit. The spent hydraulic fluid (or unspent hydraulic fluid) that has passed through each tool circuit, during operation, is returned to the HTC 16. Specifically, hydraulic fluid from the auxiliary hydraulic tool (i.e., the hydraulic lift) is returned via an auxiliary hydraulic return line 166. Hydraulic fluid from the primary and secondary tools is returned via primary and secondary hydraulic return lines 168, 170, respectively.

The hydraulic fluid is heated as it passes from the HTC 16, through the hydraulic tools, and back to the HTC 16. Accordingly, the HTC 16 is operatively connected to the heat exchanger 154, which is configured to cool the hydraulic fluid. Specifically, the HTC 16 is configured to flow heated hydraulic fluid through a main hydraulic exit line 172 and to the heat exchanger 154. While the heat exchanger 154 is illustrated as a fan-cooled heat exchanger, other types and configurations of heat exchangers are also presently contemplated. For example, the heat exchanger 154 may include shell and tube heat exchangers, plate heat exchangers, fluid heat exchangers, or any type of heat exchanger that is suitable for cooling hydraulic fluids. After the heat exchanger 154 cools the hydraulic fluid, the hydraulic fluid, during operation, flows to the hydraulic reservoir 156 via a system return line 174.

The hydraulic fluid reservoir 156, as illustrated, is operatively connected to the heat exchanger 154 and the service pack 152 and is configured to provide a source of hydraulic fluid for use by the hydraulic pump of the service pack 152. While the hydraulic fluid reservoir 156 is illustrated as connected directly to the heat exchanger 154 and the service pack 152, in other embodiments, there may be intermediate features disposed between the hydraulic fluid reservoir 156 and the heat exchanger 154 and the service pack 152, such as sensors, filters, or other hydraulic fluid monitoring or conditioning features. In the illustrated embodiment, the hydraulic fluid reservoir 156 receives the flow of cooled hydraulic fluid from the heat exchanger 154 via system return line 174. The hydraulic fluid reservoir 156 also provides a flow of hydraulic fluid, which may include at least some of the hydraulic fluid that is cooled at the heat exchanger 154, to the service pack 152 via suction line 176. For example, the pump of the service pack 152 may pull an amount of hydraulic fluid from the reservoir 156 for pressurization and provision to the HTC 16. The hydraulic reservoir 156 is also connected to the service pack 152 via a case drain line 178, which enables the reservoir 156 to receive hydraulic fluid that may build up inside the case of the one or more pumps of the service pack 152. This drained hydraulic fluid may also contribute to the hydraulic fluid that is provided to the HTC 16 by the service pack 152.

Figure 7:
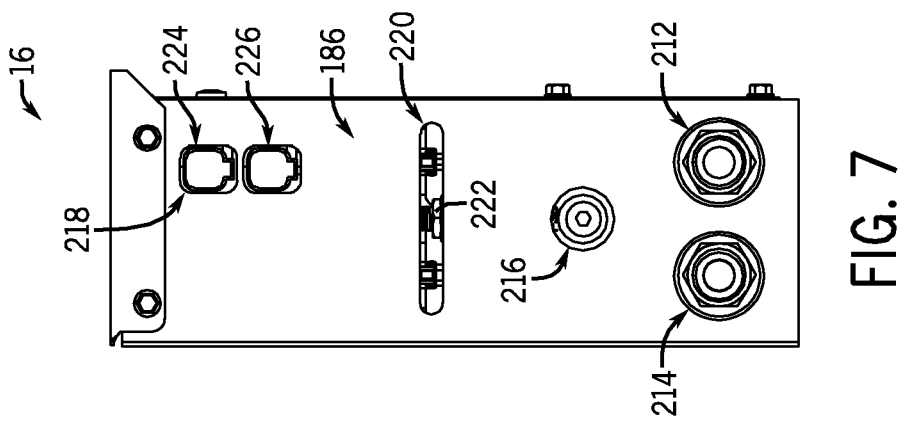
FIG. 7 is a plan view of one side of the hydraulic tool control of FIG. 6 having hydraulic connections for connecting to a heat exchanger and an auxiliary hydraulic tool and communication connections for communicating with a service pack and a service pack remote panel in accordance with the present disclosure.
Figure 6:
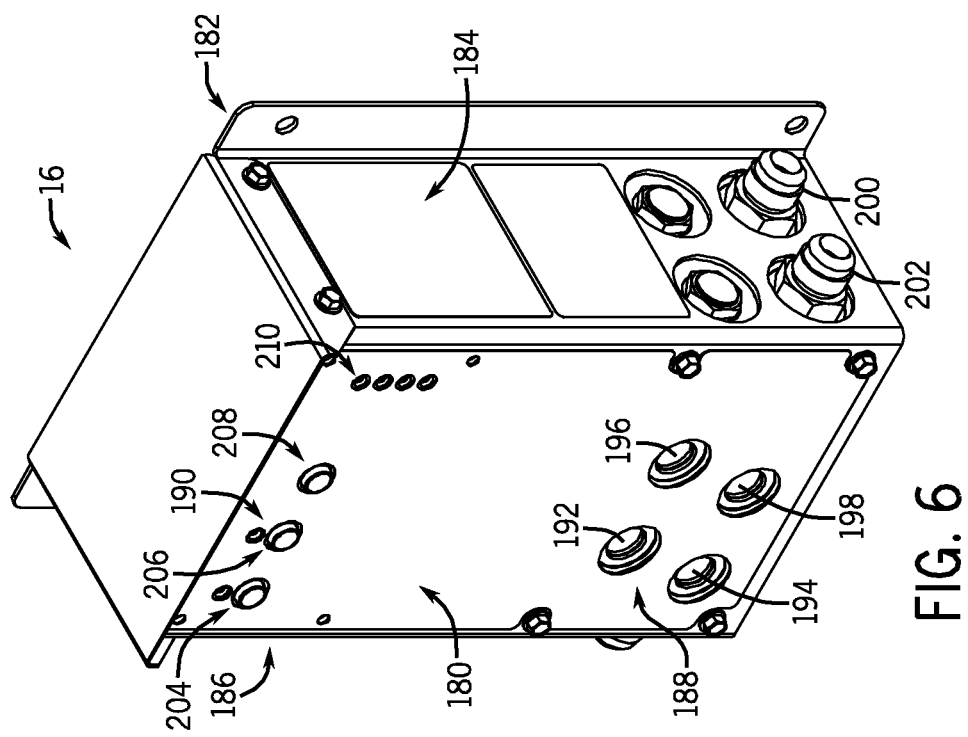
FIG. 6 is a perspective view of an embodiment of the hydraulic tool control of FIG. 5 having hydraulic connections for connecting to a plurality of hydraulic tools and an electronic user interface in accordance with the present disclosure.

Again, the HTC 16 is configured to receive the pressurized hydraulic fluid from the service pack 152 and provide the pressurized fluid to multiple hydraulic tools in a controlled manner. A perspective view of an embodiment of the HTC 16 is illustrated in FIG. 6, and depicts a plurality of connection ports and control features for providing hydraulic flow to hydraulic tools and switching the hydraulic flow as desired. The illustrated HTC 16 includes a front face 180, a back face 182 configured to mount against a work vehicle or other surface, and first and second side faces 184, 186. The perspective view of FIG. 6 provides a view of the front, back, and first side faces 180, 182, 184, while FIG. 7 provides a side view of the second side face 186.

The front face 180 of the HTC 16 includes a plurality of hydraulic connections 188 and a plurality of control inputs 190. The plurality of hydraulic connections 188 may include any type of male or female hydraulic hose connectors, such as threaded connectors, push-to-connect connectors, quick connect connectors, and so on. The hydraulic connections 188 on the front face 180 include a primary tool out connection 192, a primary tool return connection 194, a secondary tool out connection 196, and a secondary tool return connection 198. The primary tool out connection 192 is configured to connect to the primary hydraulic line 162 of FIG. 5 and output a primary flow of pressurized hydraulic fluid from the HTC 16 to a primary tool. The primary tool return connection 194 is configured to connect to the primary hydraulic return line 168 and receive a flow of heated and, in certain embodiments, used hydraulic fluid from the primary hydraulic tool. Similarly, the secondary tool out connection 196 is configured to connect to the secondary hydraulic line 164 and output a secondary flow of pressurized hydraulic fluid from the HTC 16 to a secondary hydraulic tool. The secondary tool return connection 198 is configured to connect to the secondary hydraulic return line 170 and receive a flow of heated and, in certain embodiments, used hydraulic fluid from the secondary hydraulic tool. While the illustrated embodiment depicts the HTC 16 as having connections for a primary and secondary tool, it should be noted that the HTC 16 may have any number of hydraulic connections, such that one, two, three, four or more hydraulic tools may be connected to the front face 180 of the HTC 16. For example, the HTC 16 may include 1 to 20, 2 to 10, or 3 to 5 sets of output and return connections 188 to support any number of hydraulic tools.

In addition to the connections 188 on the front face 180, the HTC 16 also includes a main pump connection 200 and an auxiliary tool out connection 202 on the first side face 184. The main pump connection 200 is configured to connect to the first hydraulic line 158 of FIG. 5 and receive a main flow of pressurized hydraulic fluid from the pump of the service pack 152. Again, the HTC 16 distributes this main flow of pressurized hydraulic fluid to multiple hydraulic tools to enable simultaneous use of the same, such as the primary tool connected to connections 192 and 194, the secondary tool connected to connections 196 and 198, and/or an auxiliary tool connected via connection 202. In one embodiment, the auxiliary tool out connection 202 is configured to connect to the auxiliary hydraulic line 160 of FIG. 5, and receive a flow of heated and, in certain embodiments, used hydraulic fluid from the auxiliary hydraulic tool.

One such auxiliary tool, as noted above, may include a hydraulic lift (e.g., a crane, man lift, stabilizer) that may be activated simultaneously with at least one other hydraulic tool, such as a primary hydraulic tool. Examples of hydraulic tools include but are not limited to, a hydraulically driven lift, wrench, saw, clamp, drill, press, lathe, machining tool, grinder, or any combination thereof. Indeed, in accordance with present embodiments, the HTC 16 provides a usable amount of hydraulic fluid to the hydraulic lift in most of its operational modes. Additionally, in situations where no other hydraulic tools are activated other than the hydraulic lift, the HTC 16 may provide a full hydraulic flow (i.e., up to the capabilities of the pump and other equipment) to the hydraulic lift. For example, in an embodiment where the pump of the service pack 152 has the ability to output 10 GPM of hydraulic fluid to the HTC 16, the HTC 16, in certain modes, may provide, approximately, the full 10 GPM flow to the hydraulic lift. Indeed, in situations where the HTC 16 is off, or in embodiments where the flow control is off, the HTC 16 may send full hydraulic flow to the auxiliary hydraulic tool (e.g., the hydraulic lift). Accordingly, the HTC 16 may be configured to provide a controlled amount of hydraulic power to one, two, three, or more of a plurality of hydraulic tools operating alone or in combination. Various operational modes of the HTC 16 are discussed in further detail below with respect to FIGS. 15-18.

As noted above, the front face 180 of the HTC 16 also has the plurality of control inputs 190, which includes an electronic power switch 204, an electronic tool circuit switch 206, and an electronic flow port select switch 208. While the control inputs 190 are illustrated as push buttons that interface with an electronic circuit in FIG. 6, they may be implemented together or separately as any user interface, such as dials, keypads, touchscreens, or similar electronic adjustors. Indeed, it may be desirable to have electronic adjustments rather than mechanical adjustment, as mechanical adjustments may be susceptible to misadjustment, inaccurate flows, or other user-based inaccuracies which can lead to time inefficiencies and, in some cases, improper tool use.

The electronic power switch 204 allows the user to turn the HTC 16 on and off, which may cut off all hydraulic flow from the HTC 16 to the hydraulic tools. For example, when the electronic power switch 204 is pushed such that the HTC 16 is off, the HTC 16 may send signals to the service pack 152 to stop pumping hydraulic fluid. The electronic tool circuit switch 206 enables a user to activate the flow control modes performed by the HTC 16. For example, in situations where the electronic tool circuit switch 206 is pressed such that the tool circuit control of the HTC 16 is off, the HTC 16 may provide full hydraulic flow to the auxiliary tool circuit, such as a crane. However, in embodiments where the electronic tool circuit switch 206 is pressed such that the HTC 16 is performing active tool control, the HTC 16 may flow certain amounts of hydraulic fluid to each hydraulic tool depending on certain factors, such as user input, sensor feedback (e.g., load sense), active control mode (e.g., each mode distributes hydraulic power in a different controlled manner), a priority control scheme (e.g., each hydraulic tool has a priority level for hydraulic power), the type of tool (i.e., primary vs. secondary vs. auxiliary), the capabilities of the pump of the service pack 152, and/or the capabilities of the engine of the service pack 152 and/or the work vehicle 10, among others.

To provide user input with regard to desired tool flow, the HTC 16 also includes the electronic flow port select switch 208, which enables the user to electronically adjust the output of the HTC 16 to certain hydraulic tools but not others, and also enables the user to adjust the flow rate of hydraulic fluid to the hydraulic tools. In other words, the electronic flow port select switch 208 may essentially be a mode select switch that enables a user to switch between active control modes. The modes that are selected by the user may be indicated or displayed via a user-perceivable indication, such as a visual and/or auditory indication. While the HTC 16 may have any number of modes, flow schemes, and so forth, in the illustrated embodiment, the HTC 16 includes a plurality of LEDs 210, which may each be disposed proximate certain text or symbolic indicia corresponding to certain modes of the HTC 16. For example, the LEDs 210 may each be disposed proximate indications such as "5 GPM," which indicates a certain mode corresponding to a flow rate of 5 gallons per minute (GPM). In certain embodiments, such an indication may correlate to the flow rate provided to the primary hydraulic tool. Alternatively or additionally, certain of the indications may correlate to the flow rate and the tool, such as "5 GPM Tool A," which indicates a 5 GPM flow to the primary hydraulic tool. Further, certain indications may correlate to flow rate and tool combinations, such as "5+5 GPM," which may indicate 5 GPM to the primary tool circuit (e.g., Tool A) and 5 GPM to the secondary tool circuit (e.g., Tool B). In Table 1 below, one embodiment of the modes of the HTC 16, corresponding to various flow rates to the hydraulic tools, is provided.

TABLE 1

Output Flow Rates

| Mode | Port A (±10%) | Port B (±10%) | Available Flow to Aux (Tool A or B in use) | Available Flow to Aux (Tool A or B not in use) | Engine Speed |
|---|---|---|---|---|---|
| Off | 0 GPM (0 lpm) | 0 GPM (0 lpm) | N/A | 10 GPM (37.8 lpm) | 1800 RPM |
| 5 GPM | 5 GPM (18.9 lpm) | 0 GPM (0 lpm) | 5 GPM (18.9 lpm) | 6 GPM (22.7 lpm) | 1800 RPM |
| 8 GPM | 8 GPM (30.3 lpm) | 0 GPM (0 lpm) | 2 GPM (7.5 lpm) | 6 GPM (22.7 lpm) | 2600 RPM |
| 10 GPM | 10 GPM (37.8 lpm) | 0 GPM (0 lpm) | 0 GPM (0 lpm) | 6 GPM (22.7 lpm) | 3200 RPM |
| 5 + 5 GPM | 5 GPM (18.9 lpm) | 5 GPM (18.9 lpm) | 0 GPM (0 lpm) | 0 GPM (0 lpm) | 3200 RPM |

In Table 1, Port A corresponds to the flow provided to the primary tool (i.e., the primary tool circuit), Port B corresponds to the flow provided to the secondary tool (i.e., the secondary tool circuit), and Aux corresponds to the flow provided to the auxiliary tool (i.e., the auxiliary tool circuit), such as a hydraulic lift. In the "Off" mode, the active flow control of the HTC 16 is off, and full hydraulic output (e.g., 10 GPM, assuming that the hydraulic output of the pump is set to 10 GPM) is provided to the auxiliary tool circuit. In the "5 GPM" mode, a maximum of 5 GPM is provided to the primary tool circuit (e.g., Tool A) and no flow is provided to the secondary tool circuit (e.g., Tool B). In situations where the primary tool circuit is in use, a maximum of 5 GPM is provided to the auxiliary tool circuit, and in situations where the primary tool circuit is not in use, a maximum of 6 GPM is provided to the auxiliary tool circuit. In other words, in such a mode, which may be considered a first mode, when other hydraulic tools are not in use, the flow to the auxiliary tool circuit may be supplemented and 4 GPM is maintained to the primary tool circuit. In the 8 GPM mode shown in Table 1, which may be considered to be a second mode, the maximum hydraulic flow to the primary tool circuit may be 8 GPM and no flow is provided to the secondary tool circuit. In situations where the primary tool circuit is in use, a maximum of 2 GPM is provided to the auxiliary tool circuit (i.e., the maximum capable flow of the pump less the flow to the primary circuit), and in situations where the primary tool circuit is not in use, a maximum of 6 GPM is provided to the auxiliary tool circuit (i.e., 4 GPM is maintained to the primary tool circuit). The 10 GPM mode, which may be considered a third mode, the HTC 16 is configured to output full hydraulic flow to the primary tool circuit and no flow to other hydraulic tools. However, when the primary tool circuit is not in use, a flow of 6 GPM is provided to the auxiliary tool circuit. Moving to the entry in Table 1 corresponding to the "5+5 GPM" mode, which may be considered a fourth mode, the flow to the primary and secondary tool circuits is substantially the same, and the auxiliary tool circuit receives no flow.

It should be noted that Table 1 is just one example of many possible modes of operation of the HTC 16. Indeed, the HTC 16 can have any number of modes where the hydraulic fluid is split into multiple flows and provided to the various hydraulic tools in certain ratios. For example, in some embodiments, the primary, secondary, and auxiliary hydraulic tools may all simultaneously receive an amount of hydraulic fluid dependent on a designated priority, a load sense at each tool, the amount of flow being used by each tool, available flow, or any combination thereof. Indeed, keeping in mind that any number of tools may be used, the primary, secondary, and auxiliary tools may have hydraulic flow ratios represented by A:B:C, where each of A, B, and C range between 0 (no flow) and 100 (full flow). The flow rates of each output to the tools may be independently variable, or the flows may be interdependent. Further, the modes of the HTC 16 may be fixed ratios of A:B:C, or the ratios of A:B:C may be adjusted. In certain embodiments, the HTC 16 may be programmable such that a user may adjust the ratios associated with a particular mode. Further, the HTC 16 may be coupled to and/or include features configured to learn from the use of each hydraulic tool.

As an example of varying flow ratios, as one flow output is adjusted, such as an adjustment of the primary flow to the primary tool, the other flows (e.g., either or both of the secondary or auxiliary flow) may also adjust. Further, the adjustment may be dependent on a total available flow. For example, for a total flow of 10 GPM output by the hydraulic power source, as the flow to the primary tool increases from 5 GPM to 6 GPM, the flows to the secondary and/or auxiliary tools may be adjusted such that their total combined flow is reduced from 5 GPM to 4 GPM.

As noted above, it may be desirable to switch between modes. In certain situations, it may be impractical to return to the service vehicle 10 to switch between modes on the HTC 16. Accordingly, the HTC 16 may also perform load sensing that enables it to switch between modes such as those described above automatically in response to an indication of a demand. For example, in situations where the HTC 16 is in 5+5 GPM mode and the user attempts to use the auxiliary tool circuit, the HTC 16 may perform a routine that determines if the use of the auxiliary tool circuit is allowable. If such use is determined to be allowable, the HTC 16 may automatically change flow rates and flow ports that allow the use of the auxiliary tool circuit. Switching between modes may also be accomplished via user input at the tool, as described in further detail below.

It will also be appreciated upon review of Table 1 that certain of the modes of the HTC 16 correspond to certain speeds of the engine. Specifically, in the embodiment represented by Table 1, these engine speeds correspond to the service engine 36 of the service pack 12, 152. Indeed, as is discussed in detail below, the HTC 16 may be configured to adjust the speed of the engine 36 to provide sufficient hydraulic output for a given hydraulic load or mode, for example to prevent engine overload and to supply ample power for a given task. In certain embodiments, such as when the hydraulic system is a standalone system (i.e., not part of a service pack), the HTC 16 may adjust the speed of the main vehicle engine 20. Such methods of operation are discussed in further detail below.

FIG. 7 illustrates a plan view of the second side face 186 of the HTC 16. The second side face 186 includes an auxiliary return connection 212, a heat exchanger out connection 214, and a variety of control and monitoring features. The auxiliary return connection 212 is configured to connect to the auxiliary hydraulic return line 166 and receive a flow of heated and, in certain embodiments, used hydraulic fluid from the auxiliary hydraulic tool. The heat exchanger out connection 214 is configured to connect with the hydraulic exit line 172, which carries heated hydraulic fluid to the heat exchanger 154 for cooling. The control and monitoring features on the second side face 186 include a pressure diagnostic port 216, communications ports 218, and an access slot 220, which enables a user to access one or more pressure adjustment features, such as a pressure relief valve 222.

The pressure diagnostic port 216 generally includes a plug positioned over an opening to the HTC 16. Once the plug is removed, a pressure gauge may be installed to the port 216, which allows a user to monitor the pressure within the HTC 16, which may correspond to a desired flow rate. For example, in one embodiment, the user may adjust the operational mode of the HTC 16 to a given flow rate, such as 5 GPM. The user may then monitor the pressure in the HTC 16 to determine whether the internal pressure of the HTC 16 is within an expected range for the given flow rate. For the 5 GPM flow rate, for example, the expected pressure may be approximately 2200 pounds per square inch (psi)±25 psi. If the measured pressure is not within the expected range, the user may make adjustments using the pressure relief valve 222. For example, the user may manually adjust the internal pressure of the HTC 16 by turning the pressure relief valve 222 with a wrench. This enables the user to adjust the internal pressure within the HTC 16 to ensure stable operation.

The communications ports 218 include first and second communications ports 224, 226, which enable communication between the HTC 16 and various devices, such as the service pack 12, 152, remote panels, control panels, diagnostic tools, controllers, computing devices, and so on. While the first and second communications ports 224, 226 are illustrated as Ethernet connections, it should be noted that any communications interface may be utilized that is capable of transferring control and diagnostics information at a desired rate, such as universal serial bus (USB) connections, serial connections, or a combination. In the illustrated embodiment, the first communications port 224 is configured to interface with a remote panel of a service pack 12, 152, and the second communications port 226 is configured to connect with a control interface of the service pack 12, 152. Thus, in the illustrated embodiment, the first and second communications ports 224, 226 may enable the HTC 16 to interface with and control certain operational parameters of the service pack 12, 152, such as the speed of the service engine 36. In other embodiments, such as when the hydraulic power system is not a part of a service pack, the communications ports 218 may interface directly with the vehicle 10 or other power source having an electronic interface. In such embodiments, the HTC 16 may have the ability to change the speed of the prime mover, such as the main vehicle engine 20 of FIG. 1.

Figure 8:
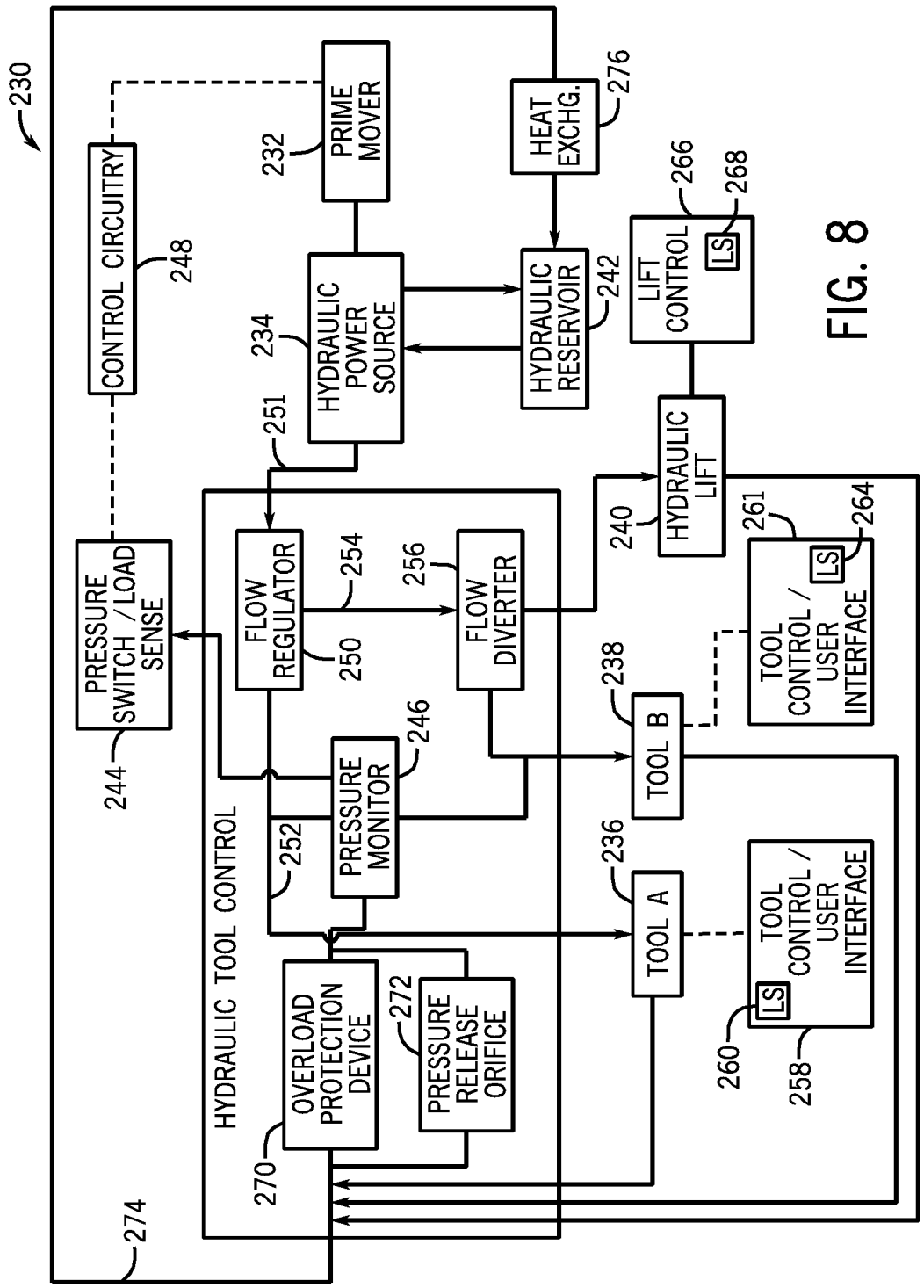
FIG. 8 is a block diagram illustrating an embodiment of a hydraulic system having a prime mover, a hydraulic power source, a hydraulic tool control, and a plurality of hydraulic tools connected to the hydraulic tool control in accordance with the present disclosure.

As noted above, the HTC 16 in accordance with certain embodiments enables the simultaneous use of multiple hydraulic tools in a hydraulic system. Additionally, in certain embodiments, the HTC 16 may adjust the speed of a prime mover (e.g., engine 36) that drives a hydraulic power source in response to an applied hydraulic load. Further, depending on the nature of the applied hydraulic load, the HTC 16 may automatically divert a flow of hydraulic fluid to certain hydraulic tool circuits but not others to enable the use of select hydraulic tools. FIG. 8 is a block diagram depicting an embodiment of a hydraulic system 230 including a prime mover 232, a hydraulic power source 234 driven by the prime mover 232, and an embodiment of the HTC 16 configured to control and monitor the flow of hydraulic fluid from the hydraulic power source 234 to a primary tool 236, a secondary tool 238, and an auxiliary tool 240 (e.g., a hydraulic lift).

The prime mover 232 that drives the hydraulic power source 234 may be a service engine of a service pack, an engine of a standalone hydraulic system, or a main vehicle engine of a service vehicle that is integrated with certain hydraulic features, as discussed above. In certain embodiments, the prime mover 232 may have multiple speeds, such as at least two speeds, at least three speeds, at least four speeds, and so on. In one embodiment, the prime mover 232 may have a continuously variable speed between a low and a high speed. The speed of the prime mover 232 may directly affect the amount of hydraulic fluid that the hydraulic power source 234 is able to pump in a given amount of time. In this way, the prime mover 232 can control the flow rate of hydraulic fluid provided to the HTC 16 and, therefore, the tools 236, 238, 240.

Each hydraulic tool 236, 238, 240 forms a closed hydraulic circuit with the hydraulic power source 234. For example, as depicted, spent hydraulic fluid that circulates through each of the hydraulic tools 236, 238, 240 is eventually cycled back to a hydraulic reservoir 242. The hydraulic power source 234 draws hydraulic fluid from the hydraulic reservoir 242 to power one or more of the hydraulic tools 236, 238, 240. The HTC 16, in the illustrated embodiment, includes or is otherwise operatively connected to a pressure switch 244 that is able to monitor the flow of hydraulic fluid from the hydraulic tools 236, 238, 240. For example, in the illustrated embodiment, the HTC 16 includes a pressure monitor 246, which monitors the flow from at least the primary tool 236 and the secondary tool 238 and sends the flow with the higher flow rate or pressure to the pressure switch 244. The pressure switch 244 may act as a thresholding device, and, when a flow rate or pressure indicative of an applied hydraulic load is passed to the pressure switch 244, the pressure switch 244 may be triggered. For example, the pressure switch 244 may be set to a certain pressure or flow rate. When the pressure monitor 246 sends a flow having a flow rate or a pressure higher than the setting of the pressure switch 244, the pressure switch 244 is triggered.

When the pressure switch 244 is triggered, one or more signals may be provided to a control circuit 248 that are indicative of the pressure or flow rate, which indicates a demand for hydraulic power. The control circuit 248, in response, is configured to adjust the speed of the prime mover 232. Further, in certain embodiments, the speed to which the prime mover 232 is adjusted by the control circuit 248 may be a function of the applied hydraulic load. For example, the control circuit 248 may continuously vary the speed of the prime mover 232 over a speed range based on the applied hydraulic load (or demand), or may increase or decrease the speed of the prime mover 232 by a series of discrete speed steps, as shown in Table 1 above, where the load applied (or the demand) may correlate with a certain optimal speed or speed range of the prime mover 232. Thus, the control circuit 248 may continuously vary or vary in a stepwise fashion the speed of the prime mover 232 based on a certain relationship between the applied load or the applied demand and the speed of the prime mover 232. For example, the control circuit 248 may vary the speed of the prime mover 232 based on a load matching relationship, based on a series of load thresholds (where each load threshold corresponds to a different prime mover speed), a proportional relationship with the applied load, or any other relationship (e.g., a function, a curve, a graph, a matrix, an equation) that varies (continuously or in a stepwise fashion) the speed of the prime mover 232 based on the load. Generally, the control circuit 248 varies the speed of the prime mover 232 over a plurality of speeds between an "off" state and a maximum speed or between an idle speed and the maximum speed. In this way, the speed of the prime mover 232 may have more speeds than may be correlated to only "on" and "off" states or idle and max states. A method corresponding to the control of prime mover speed based on applied load is discussed in further detail below with respect to FIG. 11.

Alternatively or additionally, the HTC 16 includes a plurality of flow control devices that are configured to provide select hydraulic flows to the hydraulic tools 236, 238, 240 based on user input and, in certain embodiments, sensed load demand. In the illustrated embodiment, for example, the HTC 16 includes a flow regulator 250, which is configured to receive a pressurized flow of hydraulic fluid 251. The flow regulator 250 may include one or more valves for splitting the pressurized flow 251 into a primary flow 252 provided to the primary tool 236 and a secondary flow 254 provided to a flow diverter 256. The flow regulator 250 is also configured to adjust the amount of hydraulic fluid, and thus the flow rates and pressure of the hydraulic fluid, for each of the primary and secondary flows 252, 254 using the one or more valves. Indeed, the flow regulator 250 may split the primary and secondary flows 252, 254 over any flow ratio. For example, the flow regulator 250 may split the pressurized flow 251 into a primary:secondary flow ratio of 0:1, 1:0, 1:1, 2:1, 1:2, and so on. Further, the flow ratio for the primary flow 252 and the secondary flow 254 may be represented by X:Y, where X and Y each range between 0 and 100.

The valves contained in the flow regulator 250 may be manually or electronically operated. However, in certain embodiments, electronically activated valves may be desirable to interact with the HTC 16. For example, in embodiments where the flow regulator 250 includes one or more solenoid valves, the valves may be displaced using electrical signals, which reduces the potential for operator error and can facilitate automatic or semi-automatic control of the primary and secondary flows 252, 254 using one or more control circuits, as described below. Indeed, in one embodiment, as the user makes electronic adjustments to the operational modes of the HTC 16 (e.g., via push button entries), the one or more valves of the flow regulator 250 may adjust their relative displacements to cause different flow rates to occur for the primary and secondary flows 252, 254. Further, in some embodiments, the control circuit 248 and/or the HTC 16 may monitor the one or more valves of the flow regulator 250 to stabilize flow rates. For example, the valves of the flow regulator 250 may be monitored for feedback indicative of a difference between a monitored flow rate versus a target flow rate for each of the primary and secondary flows 252, 254. The HTC 16 and/or control circuit 248 may automatically adjust the positions of the valves in response to this monitoring for flow rate stabilization.

In embodiments where the valves of the flow regulator 250 are electronically adjustable (e.g., via an electronic control signal), the control circuit 248 and/or the HTC 16 may be configured to calibrate the electronic signals provided to the valves versus their position. In this way, a certain electrical signal may be correlated to a certain valve position. In some embodiments, the HTC 16 and/or the control circuit 248 may also calibrate the electronic input to the one or more valves of the flow regulator 250 at least partially based on at least one property of the hydraulic fluid, such as density, viscosity, boiling point, or other fluid parameters.

As noted above, the primary flow 252 is provided to the primary hydraulic tool 236 for use in a given application, while the secondary flow 254 is provided to the flow diverter 256. The flow diverter 256 also includes one or more valves and is configured to provide the secondary flow 254 to the secondary tool 238 and/or the auxiliary tool 240, which in the illustrated embodiment is a hydraulic lift. Whether the secondary flow 254 is provided to either of the secondary tool 238 or the auxiliary tool 240 may depend on user input, sensed load demand, or both. Additionally or alternatively, the secondary flow may be split between the secondary tool 238 and the auxiliary tool 240 in any ratio, such as 0:1, 1:0, 1:1, 2:1, 1:2, and so on, based at least on the user input, sensed load demand, or both. Further, the flow rate split may be represented by Y:Z, where Y and Z both range between 0 and 100. For example, the flow diverter 256 may be movable between a first position, where the secondary flow 254 is directed to the secondary tool 238, and a second position, where the secondary flow 254 is directed to the auxiliary tool 240. In such embodiments, when the flow diverter 254 is energized, the flow diverter 254 is in the first position (i.e., no flow to the auxiliary tool 240), and when the flow diverter 254 is not energized, it is in the second position (i.e., no flow to the secondary tool 238). In certain of these embodiments, depending on the electrical input provided to the flow diverter 256, the flow diverter 256 may be continuously varied between its first and second positions. Indeed, the HTC 16 and/or the control circuit 248 may be configured to calibrate the electrical input to the flow diverter 256 in a similar manner to those described above for the flow regulator 250 (e.g., based on monitored versus target flow rates, valve positions, and/or hydraulic fluid properties).

A user may select a certain operational mode corresponding to the use of only the primary and secondary tools 236, 238. In such a mode, the secondary flow 254 is provided to the secondary tool 238, rather than the hydraulic lift 240, which prevents the use of the hydraulic lift 240. However, in embodiments where the user selects an operational mode that corresponds to the activation of the primary tool 236 only, or the primary tool 236 and the hydraulic lift 240, the secondary flow 254 is provided to the hydraulic lift 240. It should be noted that in certain embodiments, such as when full hydraulic flow is provided to the primary tool 236 during use, the hydraulic lift 240 may not be able to be used, as no excess flow is available. However, when the primary tool 236 is not being used in such a mode, the hydraulic lift 240 may receive a usable flow of hydraulic fluid via the secondary flow 254. That is, a flow rate of hydraulic fluid provided to the hydraulic lift 240 may be maintained above a minimum level. The minimum level may correspond to the lowest flow rate possible to maintain full or near-full operational capability of the hydraulic lift 240. Moreover, in embodiments where an operational mode other than full flow to the primary tool 236 is selected, a usable amount of hydraulic fluid may be provided to the hydraulic lift 240, even when the primary tool 236 is in use. Again, while the user may make adjustments and change between such operational modes, the HTC 16 may automatically switch between the modes based on a sensed load demand by an inactive tool (i.e., a tool to which no flow is provided), or an increased demand by an active tool. The modes also may auto switch based on a priority control scheme, which may be pre-defined or user-programmable via the HTC 16.

Indeed, the HTC 16 may be configured to adjust certain operational parameters, such as flow rates, engine speeds, split of hydraulic flows, and so on, based on a priority control scheme. The priority control scheme may enable the control of hydraulic power provided to the hydraulic tools based on priority levels assigned to each tool. As an example, the hydraulic tool that is assigned the highest priority level may receive hydraulic power as needed, no matter which operational mode the HTC 16 is in, and the hydraulic tool with the lowest priority may no longer receive hydraulic power. In certain embodiments, a user-perceivable warning may be provided on the tool or on the HTC 16 that the tool is about to become inactive. Such a priority scheme may be enabled using automatic hydraulic output switching systems as described herein. Control methods relating to automatic switching of hydraulic output by the HTC 16 are discussed in further detail below with respect to FIGS. 12-14.

In certain embodiments, as illustrated, one or more of the hydraulic tools may include a separate tool control/user interface. Further, in certain of these embodiments, the tool control/user interfaces may each include a separate load sense device. Specifically, in the illustrated embodiment, the primary tool 236 includes a respective tool control/user interface 258 with a load sense 260, the secondary tool 238 includes a respective tool control/user interface 262 with a load sense 264, and the hydraulic lift 240 includes a lift control/user interface 266 with a load sense 268. Each user interface 258, 262, 266 may enable the user to select certain operational modes of the HTC 16, make adjustments to flow rates provided to each tool, perform flow monitoring, and so forth. Indeed, each user interface 258, 262, 266 enable remote control of modes directly at their respective tools, e.g., on demand hydraulic power. Further, inputs at the user interfaces 258, 262, 266 may temporarily override a mode, or auto switch modes to provide a suitable amount of power at the tool that the user desires to use. Embodiments of such user interfaces are discussed below with respect to FIG. 19.

The load senses 260, 264, 268 may each be directly attached to their respective tool, or may each be a part of the tool control/user interface for each as depicted. The load senses 260, 264, 268 may be a transducer or similar sensing feature that is capable of measuring an indication of load demand or of active use. For example, the load senses 260, 264, 268, which may be the same or different, may include a potentiometer that measures trigger pull, a flow meter that measures flow through the tool, a button placed on the tool control at a location that is unique to active use of the tool (e.g., on a trigger, on a trigger handle), or any other such indicator of use. Further, because the HTC 16, in certain embodiments, connects with the service pack 12, 152, the load senses 260, 264, 268 may each be independently connected to the HTC 16, the service pack 12, 152, to a remote panel of the service pack 12, 152, or a combination.

The load senses 260, 264, 268, in some embodiments, each provide signals to the HTC 16 indicative of a demand for hydraulic power (i.e., a flow of hydraulic fluid). The signal may be indicative of the level of demand, and the HTC 16 may make adjustments accordingly. For example, the HTC 16 may be in a first mode having a first flow rate of the primary flow 252 to the primary tool 236. If the user activates the primary tool 236 to a point where the primary tool 236 requires more hydraulic flow than the first flow rate, the HTC 16 may switch to a second mode having a second flow rate of the primary flow 252 to the primary tool 236, the second flow rate being higher than the first flow rate. Referring to the illustrated embodiment, the HTC 16 may cause the one or more valves of the flow regulator 250 to open by an additional amount, enabling a higher flow of hydraulic fluid. Indeed, the amount by which the flow rate of the primary flow 252 increases between the first flow rate to the second flow rate may be a function of the signal provided to the HTC 16 by the load sense 260. That is, the amount by which the valves of the flow regulator 250 displace may be a function of the same. Similar operations may occur with the secondary tool 238 and the hydraulic lift 240, with the flow regulator 254 choking the primary flow 252 and increasing the secondary flow 254.

In another example, the HTC 16 may be in a first mode where the primary tool 236 and the secondary tool 238 are able to be used. In this mode, the HTC 16 does not direct hydraulic flow to the hydraulic lift 240, preventing the user from operating the hydraulic lift 240. In a situation where the user attempts to use the hydraulic lift 240, the load sense 268 of the hydraulic lift may send signals indicative of a demand for hydraulic power to the HTC 16. In certain embodiments, such as when the secondary tool 238 is not in use, the HTC 16 may switch operational modes, and the flow diverter 256 may send the secondary hydraulic flow 254 to the hydraulic lift 240 rather than the secondary tool 238. Indeed, the HTC 16 may switch between many different flow rates, flow outputs, and so forth depending on the signals received from the load senses 260, 264, 268.

In addition to including the features described above for flow control and monitoring, the HTC 16 includes an overload protection device 270 and a pressure release orifice 272. The overload protection device 270 is configured to protect the primary and secondary tools 236, 238 from damage in situations where the pressure of the hydraulic fluid reaches or exceeds a threshold. Accordingly, the overload protection device 270 may include one or more adjustable relief valves that may be adjusted based on the specifications of the tools being used. The pressure setting of the overload protection device 270 may be adjusted manually, i.e., using a handheld wrench or similar tool, or may be electronically adjusted. As an example, the overload protection device 270 may be the relief valve 222 of FIG. 7.

The pressure release orifice 272 may be a bleed down orifice of the HTC 16 that releases pressure that would otherwise be trapped within the HTC 16. For example, if a hydraulic tool is separated from the HTC 16, the connection at which the tool was connected may remain pressurized. By bleeding out hydraulic fluid (e.g., back to hydraulic fluid reservoir 156 of FIG. 5), the pressure is reduced, allowing a different tool or the same tool to be reconnected to the HTC 16. As illustrated, the overload protection device 270 and the pressure release orifice 272 are both generally disposed along a line 274 carrying the used hydraulic fluid from the hydraulic tools 236, 238, 240 to a heat exchanger 276. As an example, the line 274 may be the hydraulic exit line 172 of FIG. 5.

Figure 9:
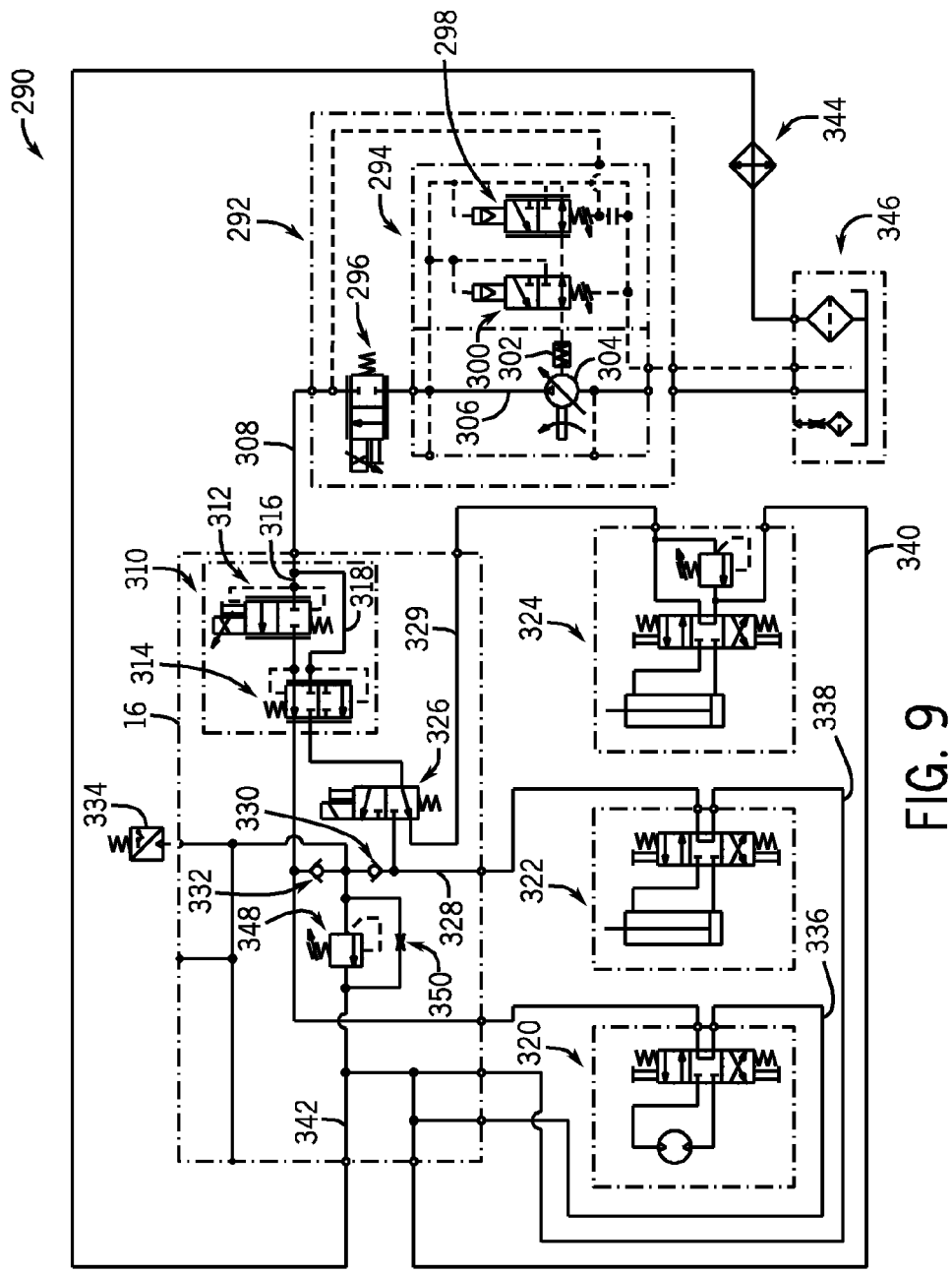
FIG. 9 is a circuit diagram depicting one embodiment of a hydraulic system having a variable displacement pump in operative connection with a hydraulic tool control and a plurality of hydraulic tool circuits connected to the hydraulic tool control in accordance with the present disclosure.

FIG. 9 is a circuit diagram depicting one embodiment of a hydraulic system 290 that is configured to enable the simultaneous use of multiple hydraulic tools, automatic switching of hydraulic output, and automatic load sensing and power compensation. The system 290 includes a hydraulic power supply 292, which is an open-center hydraulic power source that is a part of the service pack 152 of FIG. 5. The hydraulic power supply 292 includes a pump 294 and a two-way solenoid proportional valve 296. The pump 294 includes a flow compensator valve 298 and a maximum pressure compensator valve 300, which are both pilot-operated. The flow compensator valve 298 and the maximum pressure compensator valve 300 are generally configured to minimize the influence of pressure variations on the flow output by the pump 294. The pump 294 also includes a control piston 302 for a variable displacement pump portion 304. The hydraulic fluid that is pumped by the pump portion 304 flows through a first pump line 306 and through the two-way solenoid proportional valve 296. The two-way solenoid proportional valve 296 is configured to adjust the amount of hydraulic fluid delivered to the HTC 16 via a main hydraulic output line 308. The main hydraulic output line 308 may correspond to the first hydraulic line 158 of FIG. 5.

The hydraulic flow from the main hydraulic output line 308 reaches a pressure-compensated flow regulator 310, which includes a solenoid proportional valve 312 and a four-way valve 314. As illustrated, the main hydraulic output line 308 diverges into a primary flow line 316 and an excess flow line 318. The primary flow line 316 leads to the solenoid proportional valve 312, which controls the flow rate of the primary flow to a first tool circuit 320 and thus the split between the primary flow line 316 and the excess flow line 318. As noted above with respect to the flow regulator 250 of FIG. 8, the solenoid proportional valve 312 may split the flow between the primary flow line 316 and the excess flow line 318 in a ratio represented by X:Y, where X and Y each range between 0 to 100. For example, the solenoid proportional valve 312 is configured to be electronically adjusted such that its orifice size changes in proportion to an applied electrical signal to its solenoid coil. As noted above, the flow rate of the primary flow may be dependent upon the operational mode of the HTC 16, the output of the pump 294, and sensed load demands, to name a few.

The excess flow line 318 leads to the four-way valve 314, which is configured to open or close the excess flow provided to a second hydraulic tool circuit 322 and/or an auxiliary hydraulic tool circuit 324. In particular, the excess flow line 318 leads to a directional control valve 326, which is configured to determine how the excess flow is used, i.e., whether the excess flow is provided to the second hydraulic tool circuit 322 and/or the auxiliary tool circuit 324. In other words, the valve 326 controls the split of excess flow between circuits 322 and 324. For example, the excess flow may be provided to the second hydraulic tool circuit 322 and the auxiliary tool circuit 324 over a variable range, such as a range represented by X:Y, where X and Y range between 0 and 100. In embodiments where the directional control valve 326 is fully energized, it directs the excess flow to the second hydraulic tool circuit 322 through a secondary flow line 328. In embodiments where the directional control valve 326 is not energized, the excess flow is directed down an auxiliary flow line 329 to the auxiliary hydraulic tool circuit 324. In addition to leading to the second hydraulic tool circuit 322, the secondary flow line 328 interfaces with a first check valve 330. Similarly, the primary flow line 316 interfaces with a second check valve 332.

The first and second check valves 330, 332 automatically open if pressures in the excess and primary hydraulic flows respectively exceed a pressure threshold. As illustrated, the first and second check valves 330, 332 are configured such that the flow having the higher pressure (i.e., the higher of the primary or excess flow), depending on usage, flows to a pressure switch 334. The pressure switch 334 is configured such that if the higher pressure flow is at or above a threshold pressure set at the pressure switch 334, the pressure switch 334 sends one or more signals to the HTC 16 and/or a separate controller to indicate tool use. As noted above, such an indication may result in hydraulic output switching (e.g., switching the directional control valve 326, the solenoid proportional valve 312, or the two-way valve 314, or a combination), or increasing the output of the pump 294 by increasing engine speed (i.e., the engine 36 of the service pack 12, 152) and/or directly increasing pump output by adjusting the solenoid proportional valve 296 and/or the pump portion 304, or any combination thereof.

After hydraulic fluid is used by the hydraulic tools, such as the first hydraulic tool circuit 320 (e.g., a motor-driven hydraulic tool), the second hydraulic tool circuit 322 (e.g., a cylinder-driven hydraulic tool), and/or the auxiliary hydraulic tool circuit 324 (e.g., a hydraulic crane), then the spent hydraulic fuel is returned via respective hydraulic return lines 336, 338, 340 to the HTC 16. Specifically, the hydraulic return lines 336, 338, 340 all lead to a main return line 342, which may correspond to the main hydraulic exit line 172 of FIG. 5. The main return line 342 is configured to carry spent hydraulic fluid from the HTC 16 to a heat exchanger 344. As generally discussed above, after cooling, the hydraulic fluid is provided to a hydraulic fluid reservoir 346.

The main return line 342, in addition to carrying the spent hydraulic fluid from the HTC 16 to the heat exchanger 344, also interfaces with a relief valve 348 and an adjustable orifice 350. The relief valve 348, which may be manually or electronically adjustable, is configured to open based on an adjustable pressure threshold to avoid over pressurization of the HTC 16 and/or the hydraulic tools 320, 322. The adjustable orifice 350 is configured to release any pressure (e.g., release air) that may be otherwise trapped within the HTC 16, such as when a powered tool is inadvertently or purposefully detached. This allows hydraulic tools to be attached and detached from the HTC 16 without manually releasing trapped pressure.

Figure 10:
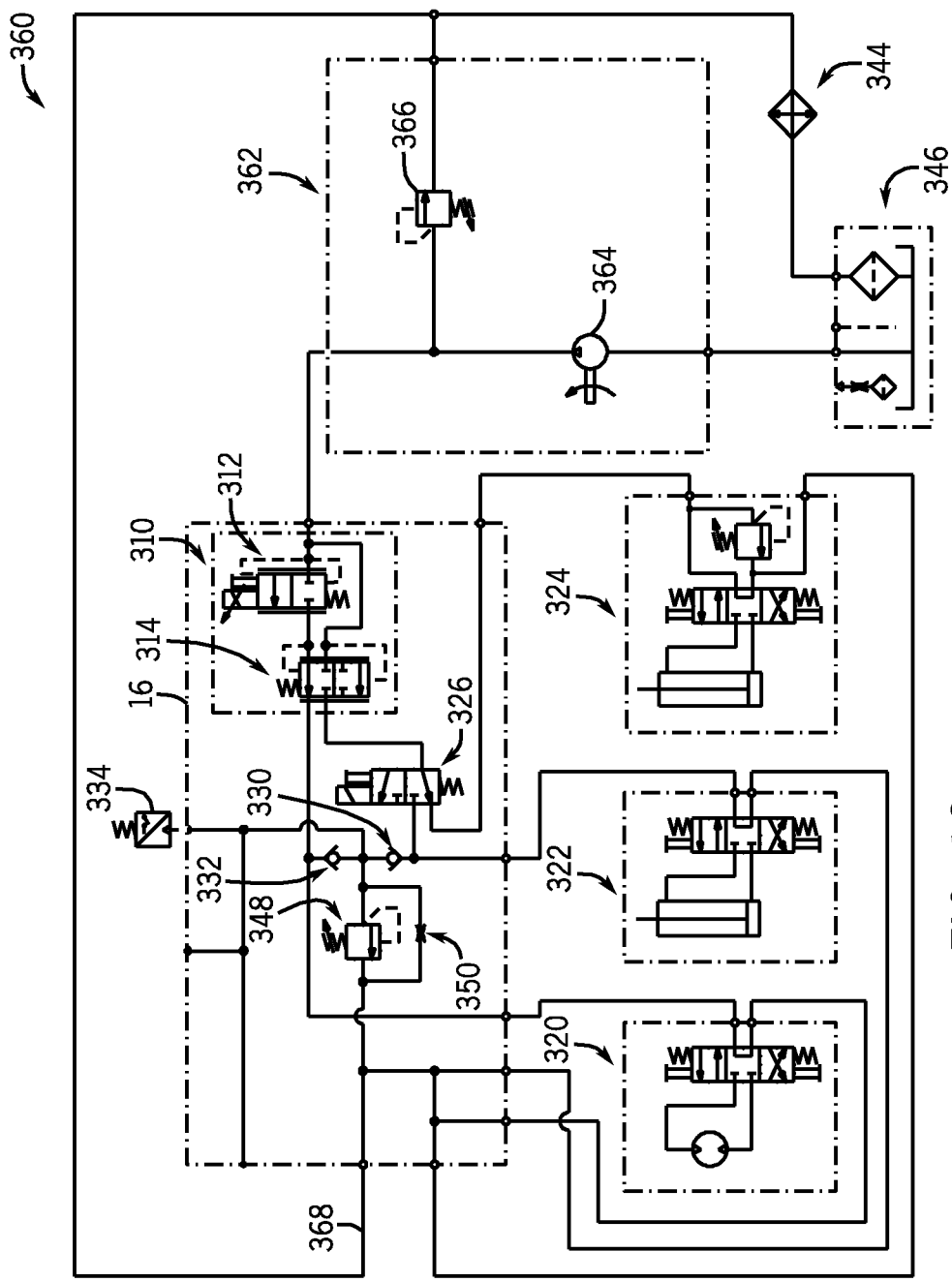
FIG. 10 is a circuit diagram depicting one embodiment of a hydraulic system having a fixed displacement pump in operative connection with the hydraulic tool control and plurality of hydraulic tool circuits connected to the hydraulic tool control of FIG. 9 in accordance with the present disclosure.

While the embodiment illustrated in FIG. 9 depicts the HTC 16 and hydraulic tools 320, 322, 324 as being operatively connected to a hydraulic pump of a service pack, as noted above, the present embodiments are also applicable to any hydraulic power source, such as a fixed displacement pump. FIG. 10 is a circuit diagram of an embodiment of a hydraulic system 360 where the HTC 16 receives pressurized hydraulic fluid from a fixed displacement pump 362. It should be noted that many of the features illustrated in FIG. 10 are the same as the corresponding features illustrated in FIG. 9. Accordingly, those features are referenced using the same numerals. The fixed displacement pump 362, as illustrated, includes a fixed displacement pump portion 364 and a pressure relief valve 366, which is connected to a return line 368 leading from the HTC 16 to the heat exchanger 344. In certain embodiments, the pressure relief valve 366 may be set to a certain pressure based on the desired output of the fixed displacement pump 362. Indeed, the pressure threshold of the pressure relief valve 366 may be adjusted by the HTC 16 or another controller in response to a signal indicative of a hydraulic load or a demand for hydraulic fluid. For example, the pressure threshold of the pressure relief valve 366 may be increased if a higher pressure/flow rate of hydraulic fluid is desired from the fixed displacement pump 362. The operation of the hydraulic system 360 is generally as described above. Thus, the system 360 is configured to enable the simultaneous use of multiple hydraulic tools, output switching, load sensing and power compensation, or any combination thereof.

Figure 11:
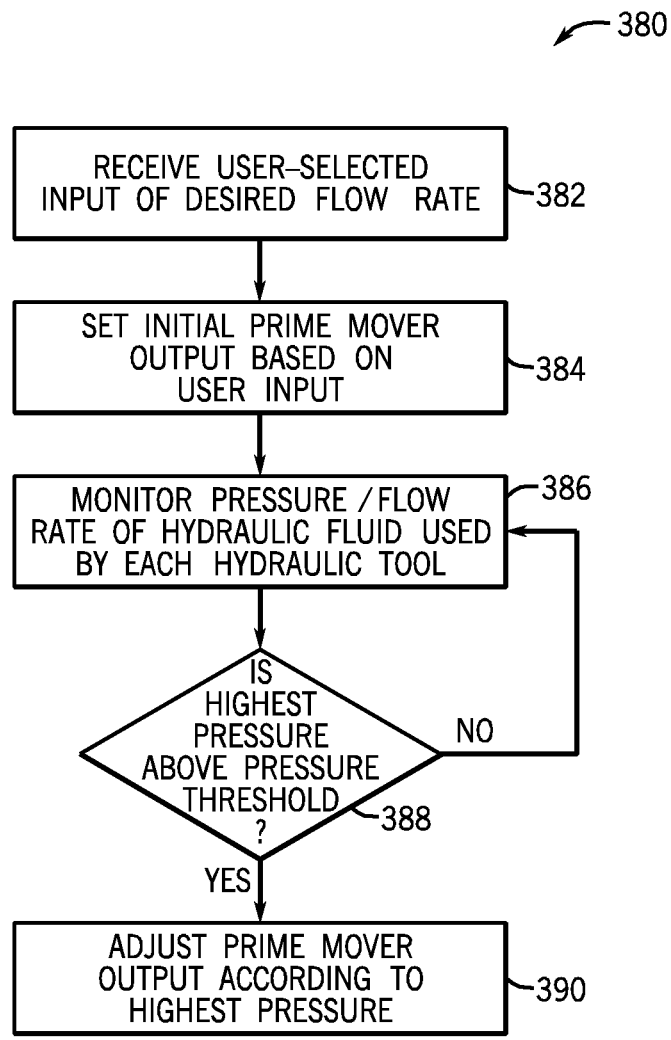
FIG. 11 is a process flow diagram illustrating one embodiment of a method for adjusting prime mover output based on a sensed demand for hydraulic fluid in accordance with the present disclosure.

The present embodiments, as generally discussed above, are applicable to a controller in operative connection with any hydraulic power source. Indeed, the present embodiments provide certain control/operational methods that may be used in conjunction with any or a combination of the systems described herein. For example, the methods described below with respect to FIGS. 11-14 may be stored as routines on a non-transitory, tangible, machine-readable medium that is capable of being accessed by a processor-based computer or controller. Additionally or alternatively, certain of the steps described herein may be performed by the HTC 16 (e.g., a valve of the HTC 16) or a sensing feature in communication with, contained within, or otherwise operatively connected to the HTC 16, such as a pressure switch, load sense line, user interface, and so on. FIG. 11 is a process flow diagram illustrating an embodiment of a method 380 of compensating the power output by an engine in operative connection with a hydraulic power source in response to applied hydraulic load. In the illustrated embodiment, the method 380 begins with receiving a user-selected input of a desired flow rate for a hydraulic power source (block 382). As an example, the user-selected input may include an operational mode selection performed on the HTC 16. The selection of the desired flow rate, which may be considered a first flow rate, may then be correlated to an initial prime mover output. The operational mode flow rate/tool combinations and associated engine speeds set forth above in Table 1 may be one example.

Thus, based on the user-selected input, the HTC 16 or other controller may then set an initial prime mover (e.g., engine 36) based on the user-selected input (block 384). This initial output may be considered a first engine speed. Once the engine is at the first engine speed, the HTC 16 and/or associated controller and sensors monitor the pressure and/or flow rate of hydraulic fluid that is used by each hydraulic tool connected to the HTC 16 (block 386). For example, as set forth above with respect to FIG. 8, the pressure monitor 246 may monitor the flow through the lines that are connected to any one or a combination of hydraulic tools connected to the HTC 16. Alternatively or additionally, one or more load sensing features may be integrated with or otherwise operatively connected to each hydraulic tool, such that the load sensing features may send indicative signals to the HTC 16 and/or controller in operative connection with the HTC 16.

The HTC 16 and/or controller then determines if the highest of pressures in the different hydraulic flow lines (or highest of flow rates) is above a pressure threshold (or a flow rate threshold) (query 388). For example, the pressure switch/load sense 244 of FIG. 8 may be set to a certain pressure or flow rate threshold such that when triggered, a signal indicative of a load may be provided to the HTC 16 and/or the control circuit 248, either or both of which may be in communication with the prime mover 232. In embodiments where the pressure or flow rate is not above the threshold (e.g., the pressure switch/load sense 244 is not triggered), the method 380 cycles back to monitoring (block 386).

However, in embodiments where the pressure or flow rate is above the threshold (e.g., the pressure switch/load sense 244 is triggered and sends a signal to the HTC 16 and/or control circuit 248), the speed of the prime mover is adjusted to accommodate the load demand (block 390). For example, the HTC 16 and/or the control circuit 248 may send one or more control signals to the prime mover 232 to increase its speed according to the higher output demand. As noted above, the speed increase may generally be a function of the load demand. Thus, the speed adjustment may be a load matching adjustment where the speed of the prime mover is continuously varied throughout a speed range of the prime mover, a step-wise adjustment to a higher speed of the prime mover (e.g., through a plurality of speeds) that is capable of providing adequate output (e.g., through the speeds set forth in Table 1) for the load, or the adjustment may be an adjustment that is proportional or otherwise continuously variable with the increase in demand but not an actual load matching adjustment (i.e., the speed may not be exactly matched with the load).

Figure 12:
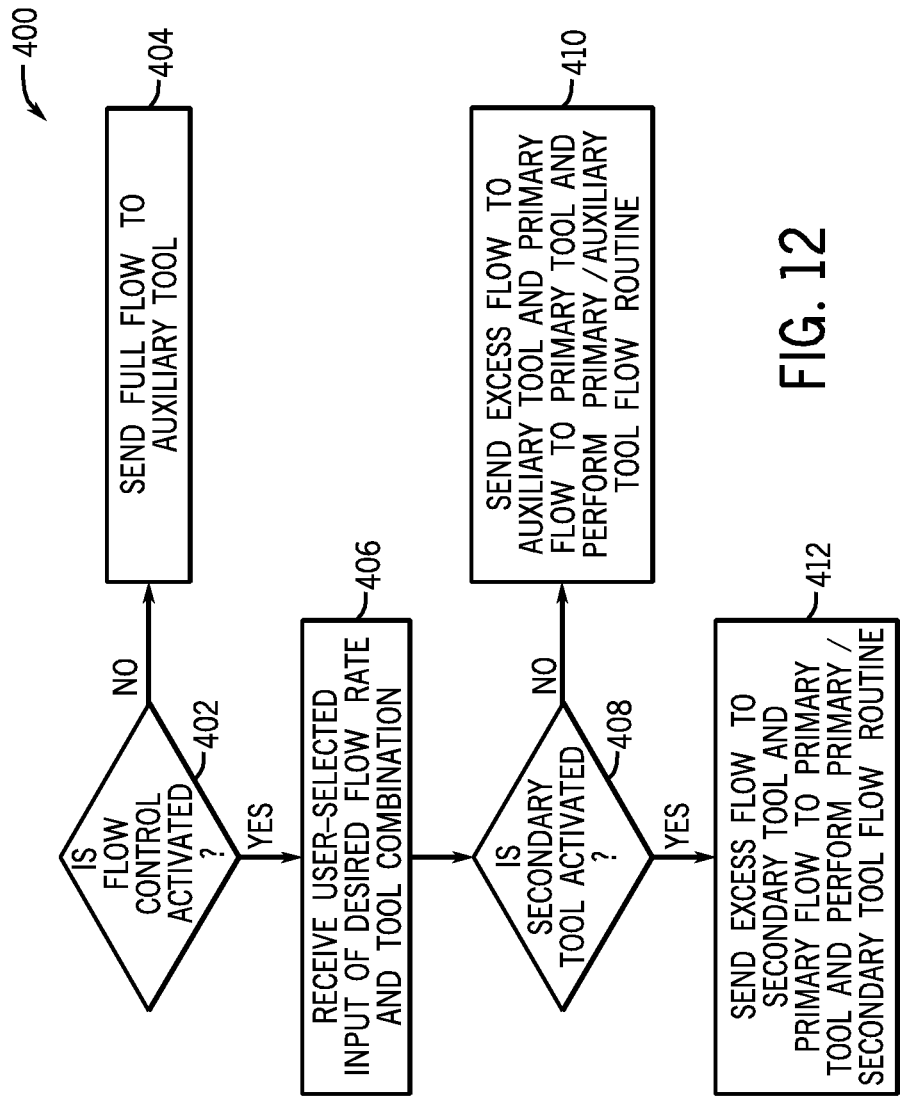
FIG. 12 is a process flow diagram illustrating one embodiment of a method for controlling hydraulic output with a hydraulic tool control in accordance with the present disclosure.

In addition to, or in lieu of performing the output adjustment method 380 described above, the HTC 16 may also perform output switching methods, as described below with respect to FIGS. 12-14. FIG. 12 illustrates a process flow diagram of a general method 400 for performing hydraulic output switching in response to a user input and/or an applied load. Method 400, as illustrated, includes determining whether the flow control of the HTC 16 is activated (query 402). In embodiments where the flow control has not been activated, such as when the valves of the HTC 16 are not being controlled and are in their respective non-energized positions, the full flow received by the HTC 16 is provided to the auxiliary tool (block 404). As an example, when the user has not turned on the flow regulation and flow control features of the HTC 16, full hydraulic fluid flow may be provided to the hydraulic lift 240 of FIG. 8.

However, in embodiments where the flow control is activated, the HTC 16 receives a user-selected input of a desired flow rate and tool combination (block 406). In other words, the user selects a certain operational mode corresponding to which tools the user desires to use and which flow rate is appropriate, or believed to be appropriate at the time of choosing. It should be noted that the user selection may be at an interface at the HTC 16, or using a user interface that is attached or otherwise operatively connected to a hydraulic tool in communication with the HTC 16. The user interface may be or include a series of buttons, a keypad, a touchscreen, or other feature. Embodiments of user interfaces are described in further detail below with respect to FIG. 19.

The HTC 16, depending on the user selection, determines whether the secondary hydraulic tool has been activated (query 408). In other words, the HTC 16 determines how the excess flow is used while the primary flow is provided to the primary tool. For example, the HTC 16 may receive the user input at block 406, and may divert a flow of hydraulic fluid to the secondary tool 238 or to the hydraulic lift 240 of FIG. 8. In embodiments where the user selects the use of the auxiliary tool, such as the hydraulic lift 240, the HTC 16 sends the excess flow to the auxiliary tool and the primary flow to the primary tool, and performs a primary/auxiliary tool flow routine (block 410), which is described in further detail below with respect to FIG. 14. As an example, referring to FIG. 9, the directional control valve 326 may be left off, in which case the excess flow is sent along the auxiliary flow line 329 and to the auxiliary hydraulic tool circuit 324. Returning to FIG. 12, in embodiments where the secondary tool is activated, the excess flow is sent to the secondary tool and the primary flow is sent to the primary tool, and a primary/secondary tool flow routine is performed (bock 412), which is described in further detail below with respect to FIG. 13. For example, referring again to FIG. 9, the directional control valve 326 may be energized and the excess flow sent along the secondary flow line 328 and to the secondary hydraulic tool circuit 322.

Figure 13:
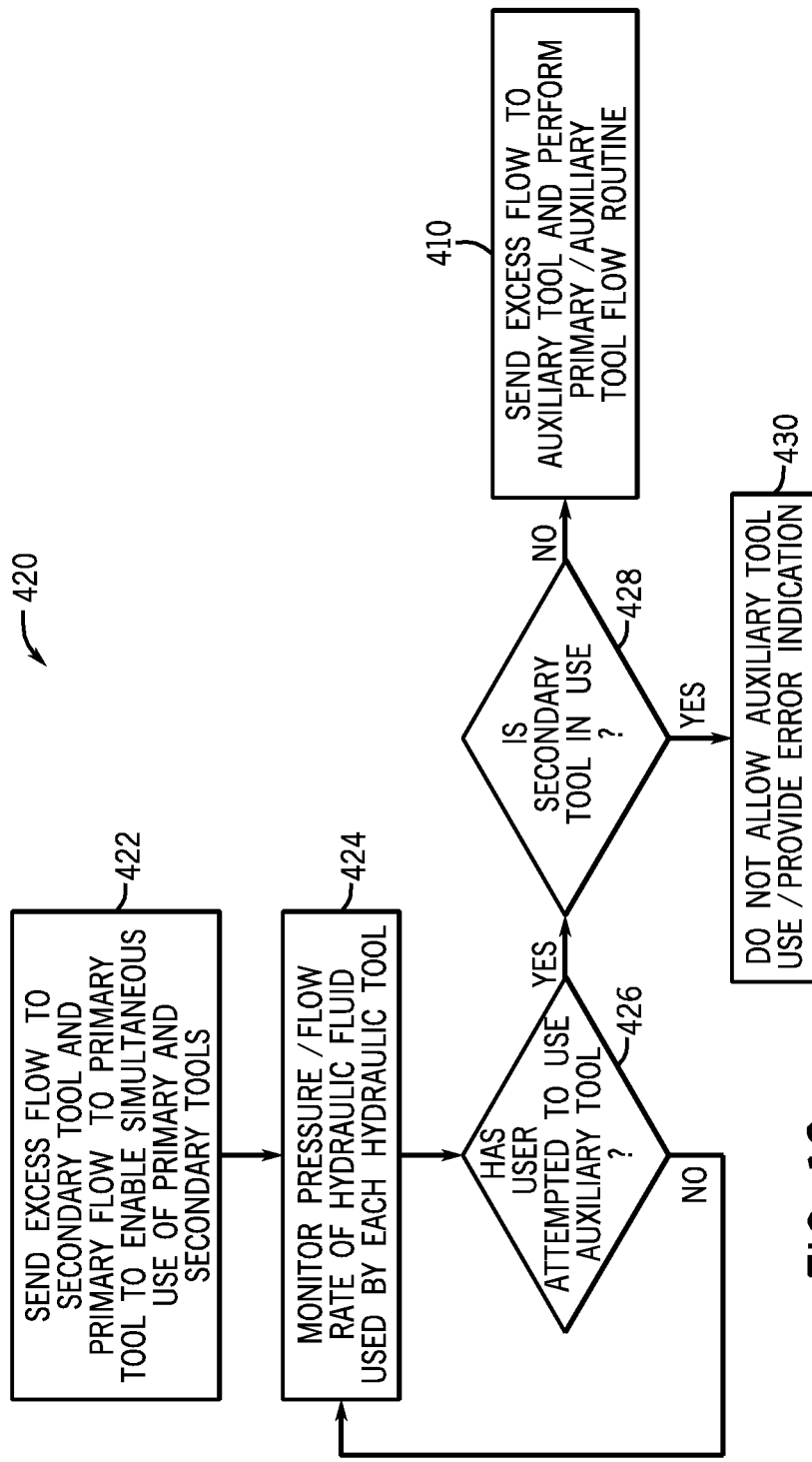
FIG. 13 is a process flow diagram illustrating one embodiment of a method for controlling hydraulic output with a hydraulic tool control while the hydraulic tool control is providing hydraulic fluid to a primary and a secondary hydraulic tool in accordance with the present disclosure.

FIG. 13 is a process flow diagram of an embodiment of a primary/secondary flow control routine 420, which may be performed after or in conjunction with method 400 of FIG. 12. The routine 420 starts with sending the primary flow to the primary tool circuit and the excess flow to the secondary tool circuit (block 422). As noted above, the acts represented by block 422 may include energizing the directional control valve 326 of FIG. 9. The pressure/flow rate of the hydraulic fluid to the primary and secondary tool circuits is then monitored (block 424) as described above with respect to either of FIG. 8 or 9. As the HTC 16 performs this monitoring function, the HTC 16 may also determine whether the user has attempted to use the auxiliary tool (query 426). For example, the monitoring may simply include passive acts, such as waiting for a signal indicative of a demand for hydraulic fluid, or may include more active monitoring, such as by sending signals, substantially continuously or at intervals, to the auxiliary tool to determine the presence of an indicator of demand, such as a trigger position on an auxiliary tool control.

In embodiments where no attempt to use the auxiliary tool is made, the method 420 continues monitoring. However, in embodiments where the user attempts to use the auxiliary tool, the HTC 16 may determine whether the secondary tool is in use (query 428). In embodiments where the secondary tool is in use, the HTC 16 does not change output, and may also provide an error indication to the user, such as a visual, auditory, and/or tactile indication to the user that the simultaneous use of the secondary and auxiliary tool is not allowed (block 430). However, in embodiments where the secondary tool is not in use, the HTC 16 may send the excess flow to the auxiliary tool (e.g., by turning the directional control valve 326 of FIG. 9 off) and perform a primary/auxiliary flow routine (block 410).

Figure 14:
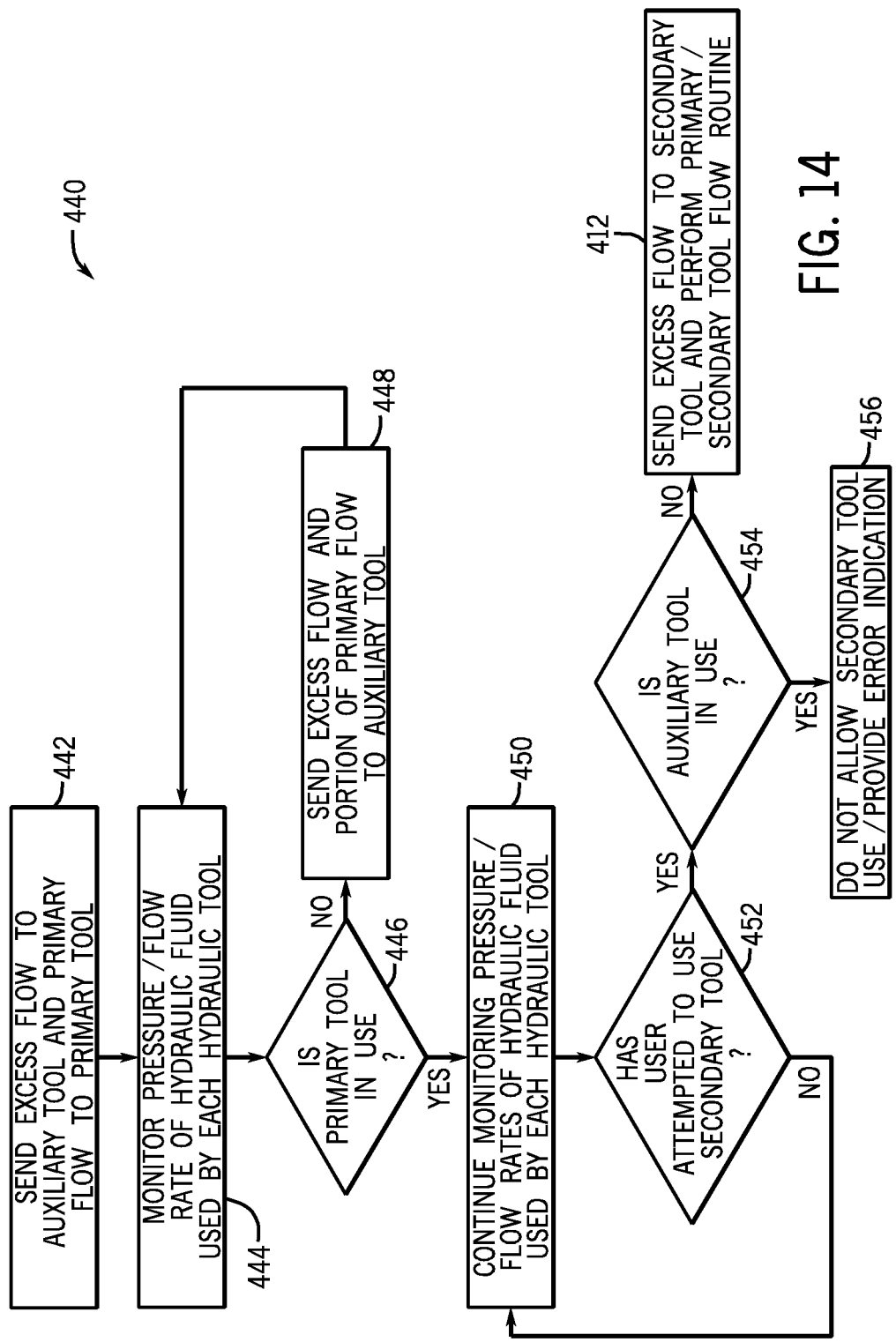
FIG. 14 is a process flow diagram illustrating one embodiment of a method for controlling hydraulic output with a hydraulic tool control while the hydraulic tool control is providing hydraulic fluid to a primary and an auxiliary hydraulic tool in accordance with the present disclosure.

FIG. 14 is a process flow diagram of an embodiment of a primary/auxiliary flow routine 440 that may be performed by the HTC 16. The method begins with sending the primary flow to the primary tool and sending the excess flow to the auxiliary tool, which may be a hydraulic lift, such as a crane (block 442). The HTC 16 then monitors the pressure and/or flow used by the hydraulic tools (block 444). For example, the HTC 16 may monitor the pressure and/or flow rate of the hydraulic fluid provided to the primary tool and/or the auxiliary tool. Additionally or alternatively, any one or a combination of the hydraulic tools may include a load sense that is configured to send signals to the HTC 16 indicative of a demand for hydraulic fluid. In such embodiments, the load sense may monitor certain features of a tool control that indicate a demand for hydraulic fluid, such as hydraulic pressure, hydraulic fluid flow rate, a trigger position, a handle sensor, a potentiometer, or the like. As noted above with respect to FIG. 13, the monitoring that is performed may be passive or active monitoring.

While monitoring the hydraulic demand for each tool, the HTC 16 may also determine whether the primary tool is in use (query 446). In embodiments where the primary tool is not in use, the HTC 16 supplements the excess flow with additional hydraulic fluid that would otherwise be sent to the primary tool (block 448). For example, if the excess flow has been selected to have a flow rate of 5 GPM, if the primary tool is not in use, then the excess flow may be supplemented with additional hydraulic fluid such that it has a flow rate of 6 GPM. However, any suitable combination of flow rates may be used. The routine may then cycle back to monitoring in accordance with block 444.

In embodiments where the primary tool is in use, then the HTC 16 continues monitoring pressures and/or flow rates (block 450). While performing its monitoring, the HTC 16 also determines whether the user has attempted to use the secondary hydraulic tool (query 452). As noted above, this monitoring process may be passive or active. That is, the HTC 16 may respond to signals indicative of a demand for hydraulic fluid (e.g., by signals generated at the tool), or may actively determine the state of each tool. In embodiments where the user has not attempted to use the secondary hydraulic tool, the routine may cycle back to the monitoring acts of block 450. However, in embodiments where the user has attempted to use the secondary tool, the HTC 16 may determine whether the auxiliary hydraulic tool is in use (query 454).

In embodiments where the auxiliary tool is in use, the HTC 16 may provide a user-perceivable indication that the secondary tool may not be used (block 456). For example the HTC 16 may provide an auditory, visual, and/or tactile indication that the secondary tool may not be used. However, in embodiments where the auxiliary tool is not in use, the HTC 16 may send the excess flow to the secondary tool and the primary flow to the primary tool, and may begin performing a primary/secondary flow routine (block 412), which may be the routine 420 described above. For example, referring to FIG. 9, the directional control valve 326 may be energized, sending the excess flow to the secondary flow line 328.

As discussed above, the HTC 16 may be used in conjunction with any hydraulic power source capable of providing a flow of hydraulic fluid at a pressure sufficient for use with hydraulic tools. The flow of hydraulic fluid to the tools is controlled by the HTC 16, which also enables a user to make electronic adjustments to ratios or splits of the hydraulic power among multiple tools, flow rates, pressures, tool activation, and so forth. Thus, in addition to providing internal components that may be automatically and/or manually controlled and adjusted, the present disclosure provides example embodiments of interfaces for the HTC 16 as well as hydraulic tool interfaces that may relay information to the HTC 16.

Indeed, FIGS. 15-18 illustrate example embodiments of interfaces for the HTC 16. Furthermore, it should be noted that while these interfaces are described in the context of faceplates for the HTC 16, that any or a combination of their features may be incorporated into a user interface for a hydraulic tool in operative connection with the HTC 16, such that the user interface enables similar or the same control over the operation of the HTC 16 as the faceplates described herein. Specifically, FIG. 15 illustrates an embodiment of a faceplate 460 that is configured to be placed against the front face 180 of the HTC 16 (FIG. 6). The faceplate 460 includes a hydraulic connector section 462 and a user input/indicator section 464. The hydraulic connector section 462 includes hydraulic fluid supply and return connectors for both the primary tool and the secondary tool. As illustrated, the faceplate 460 includes a primary tool supply connector cover 466, and a text indicator labeling the connector under the connector cover 466 as "Pressure Port A." Of course, the text indicia discussed herein may be any text or symbolic indicia capable of communicating the functionality of the feature corresponding to the indicia. Proximate the connector cover 466, a primary tool return connector cover 468 corresponding to the connector for the hydraulic return line from the primary tool is provided. A text indicator is also provided proximate labeling the primary tool return connector cover 468 as "Return Port A." In the illustrated embodiment, the connector cover 468 is below the connector cover 466. However, it should be noted that the interfaces and faceplates described herein may have any arrangement corresponding to the particular connector placement on a given hydraulic tool control. The faceplate 460 further includes a secondary tool supply connector cover 470 and a secondary tool return connector cover 472. Connector cover 470 is labeled as "Pressure Port B," and connector cover 472 is labeled as "Return Port B." Because the HTC 16 may include any number of pressure and return connections, the faceplate 460 may include any number of pressure and return port sets, such as 1 to 20, 2 to 10, or 3 to 5 sets.

The faceplate 460 may also include various instructions, warnings, or other text or symbolic indicia, which are provided to facilitate the use of the HTC 16. In the illustrated embodiment, a series of symbolic warnings 474 are provided, along with text 476 indicating the nature of the controller attached to the faceplate 460. The faceplate 460 also includes an area 478 for any other indicia, such as brand names, personalization, or the like.

The user input/indicator section 464 of FIG. 15 includes a plurality of buttons configured to enable the user to electronically switch between various operational modes of the HTC 16, such as modes where the HTC 16 enables the simultaneous use of multiple hydraulic tools. The buttons includes a power on/off button 480, which enables the user to turn the HTC 16 on and off. An indicator 482, which in the illustrated embodiment includes an LED light 482, is provided proximate the power on/off button 480 to indicate to the user that the HTC 16 is on or off. A tool circuit on/off button 484 is also provided to enable the user to electronically activate the active flow control features of the HTC 16. For example, when the user presses the tool circuit on/off button 484 such that the tool control of the HTC 16 is on, as indicated by a corresponding LED light 486, the HTC 16 may begin actively controlling the flow of hydraulic fluid to multiple hydraulic tools, rather than providing the full hydraulic flow to the auxiliary tool circuit.

In addition to the power on/off button 480 and the tool circuit on/off button 484, the faceplate 460 includes a flow/port select button 488. The flow/port select button 488 enables the user to electronically cycle through the various operational modes of the HTC 16. The operational modes are identified on the faceplate by a series of text indicia 490, 492. Each operational mode text indicator is proximate a respective LED light 494. In this way, when a given operational mode is selected, the LED light 494 proximate the selected mode is activated. As the user electronically cycles through the operational modes of the HTC 16, the HTC 16 may adjust the flow to the primary, secondary, or auxiliary tool, or a combination thereof. For example, depending on the selected mode, the HTC 16 may provide an excess flow to a secondary tool, rather than an auxiliary tool. In another example, the modes of the HTC 16 may adjust a ratio or split of hydraulic power among multiple tools, such as to the primary, secondary, or auxiliary tool, or a combination thereof. As an example, the ratio or split may be predefined, user programmable, or the like. Indeed, as set forth above, the ratio or split of hydraulic power among the primary, secondary, and auxiliary tools may be represented by A:B:C, where A, B, and C each range between 0 to 100, 0 to 10, or 0 to 5. In a further example, which may occur in addition to or in lieu of hydraulic output switching, the HTC 16 may directly or indirectly (e.g., via a separate controller) cause a prime mover that drives a hydraulic power source to increase or decrease its speed to adjust a total flow of hydraulic fluid provided to the HTC 16 from the hydraulic power source.

The illustrated faceplate 460 also includes text indicia 496 that provides information regarding the functionality of one or more of the hydraulic tools while the HTC 16 is in certain modes. Specifically, the text indicia 496 include a box 498 encompassing certain of the mode indicators with text specifying that the crane, or other auxiliary tool connected to the HTC 16, is not functional while either of the encompassed modes are activated. For example, the modes encompassed by the box may correspond to the 10 GPM and 5+5 GPM modes set forth above in Table 1. As shown in Table 1, the auxiliary tool (e.g., a crane) is not able to be used in either of these modes if the primary tool is in use (in the 10 GPM mode) or if the mode is selected (in the 5+5 GPM mode). The faceplate 460 may also include any other combination of indicia, such as the operability of the secondary hydraulic tool in certain modes, maximum flow rates to certain tools while in certain modes, and so on.

FIG. 16 illustrates a similar embodiment of a faceplate 500 for the HTC 16. The illustrated faceplate 500 includes many of the same features as the faceplate 460 of FIG. 15, and those features are indicated with the same reference numerals. The faceplate 500, in addition to or in lieu of the button 488 for cycling through the various operational modes of the HTC 16, includes a flow/port select dial 502, which is configured to enable the user to electronically select operational modes of the HTC 16. The dial 502 may enable the user to adjust the HTC 16 between flow rates and/or port selections by enabling two-way variability. For example, as illustrated, the HTC 16 may be in the 8 GPM mode. Using the dial 502, the user may turn the dial 502 counterclockwise to select the 5 GPM mode, or clockwise to select the 10 GPM mode. In some embodiments, these buttons may be used to adjust the flow rate of one or more tools, the ratio or split of hydraulic flow among tools, or the like.

FIG. 17 illustrates another embodiment of a faceplate 510 for the HTC 16. The illustrated faceplate 510 includes many of the same features as the faceplate 460 of FIGS. 15 and 16, and those features are indicated with the same reference numerals. The faceplate 510, in addition to or in lieu of the button 488 and/or the dial 502, includes a flow/port select button set 511. The button set 511 includes a "+" button 512 and a "−" button 514, which are configured to enable the user to electronically select operational modes of the HTC 16. Each of the buttons 512, 514 has a respective LED light 516, 518, which are configured to provide a visual indication to the user when either of the buttons are pressed/activated. The button set 511 may enable the user to adjust the HTC 16 between flow rates and/or port selections by enabling two-way variability. For example, as illustrated, the HTC 16 may be in the 8 GPM mode. Using the + button 512, the user may select the 10 GPM mode, and using the − button 514, the user may select the 5 GPM mode. In some embodiments, these buttons 512, 514 may be used to adjust the flow rate to one or more tools, to adjust the ratio or split of hydraulic flow among various tools, or the like.

While the embodiments set forth in FIGS. 15-17 include text indicia 490, 492, 496 and a series of LED lights 494 for indicating the operational mode selected and various other operational parameters, alternatively or additionally, other indication features may be used. FIG. 18 illustrates one such embodiment of a faceplate 520 having an electronic readout 522, which may be an LED screen, an LCD screen, a touch panel display, or any similar screen capable of generating text and/or symbols. Again, the electronic readout 522 may be used in addition to or in lieu of the text/light indications 490, 492, 494, 496 discussed above. The electronic readout 522 includes a mode indication 524 and an operational parameter indication 526. In the illustrated embodiment, the mode indication 524 indicates that the HTC 16 is in 5+5 GPM mode. Accordingly, the operational parameter indication 526 indicates that no auxiliary output is available. The operational parameter indication 526 may be used to provide any operational parameter that is germane to the operation of the HTC 16. For example, when the HTC 16 is in 8 GPM mode, the operational parameter indication 526 may indicate "no secondary tool," or similar text, indicating that the secondary tool may not be used. The operational parameter indication 526 may also provide certain warnings, such as an indication that the secondary tool may not be used while the crane is in use. Further, the operational parameter indication 526, and other features of the faceplate 510 of FIG. 18 or any of the faceplates described herein may enable a user to program the amount of flow provided to each hydraulic tool during operation, such as split ratios, modes with associated split ratios, and so forth. Furthermore, such programmability may also enable the user to select priority levels for each tool. For example, the user may assign the highest priority to the auxiliary tool (e.g., the hydraulic crane), with other tools, such as crimps, drills, saws, etc. being lower priority. The user may also input or adjust threshold pressures, threshold flow rates, or any similar input that enables the operation of the HTC 16 to be customized to the particular use of the end user.

As discussed above with respect to FIG. 8, any one or a combination of the hydraulic tools 236, 238, 240 may include a tool control/user interface that may be in communication with the HTC 16 and/or the control circuit 248. FIG. 19 illustrates an embodiment of one such hydraulic tool/hydraulic tool control interface 530. Indeed, while the embodiment illustrated in FIG. 19 is described in the context of a user interface on a hydraulic tool, it should be noted that the interface may be used as a faceplate or similar interface disposed on or otherwise in operative connection with the HTC 16. The hydraulic tool/hydraulic tool control interface 530 is configured to enable a user to make electronic adjustments to the HTC 16, calibrate the response of the HTC 16 to the operation of the hydraulic tool, and monitor flow rates/pressures. Certain of the inputs may have similar functionality to those described above for the faceplates of the HTC 16.

For example, the interface 530 includes a tool circuit on/off button 532, which may have the same functionality as the tool circuit on/off button 484 of FIGS. 15-18. An LED indicator 534 proximate the button 532 is also provided, for example to provide a visual indication to the user when the HTC 16 is performing active output control. The interface also includes a plurality of flow/port select adjustors, which are each configured to enable the user to electronically adjust the operational mode of the HTC 16. Indeed, the interface 530 includes a flow/port select button 534, a flow/port select dial 536, and a flow/port select button set 538, which correspond to and perform the same operations as the flow/port select button 488 of FIG. 15, the flow/port select dial 502 of FIG. 16, and the flow/port select button set 511 of FIG. 17, respectively.

The interface 530 also includes a tool calibration on/off button 540 and associated LED indicator 542. The tool calibration on/off button 540 enables the user to calibrate certain operational modes of the HTC 16 with, for example, a percentage activation of the hydraulic tool to which the interface 530 is connected. For example, the user may desire to correlate certain operational modes of the HTC 16 with a certain level of activation of the hydraulic tool, such as by adjusting thresholds (e.g., pressure thresholds, flow rate thresholds) or adjusting load thresholds corresponding to mode changes. Accordingly, the user is able to change the HTC 16 to a calibration mode or a similar inactive mode by pressing the tool calibration on/off button 540. The LED indicator 542 then illuminates, which indicates the HTC 16 is in a mode where it is able to be calibrated or otherwise programmed and/or adjusted. The user may then cycle through the operational modes and/or operating thresholds of the HTC 16, which may be viewed by a digital readout 544 and/or LED/text indicia 546.

The user may then correlate the selected operational mode and/or selected operating threshold of the HTC 16 with an activation of the hydraulic tool, which may be indicated by a tool activation meter 548 and/or a tool activation digital readout 550. In certain embodiments, the tool activation that is displayed may correlate to a percentage trigger activation of the hydraulic tool. For example, the user may trigger the tool to a certain extent (e.g., 60%), and correlate the amount of activation of the tool with the selected operational mode of the HTC 16.

The interface 530 also includes a user input panel 552, which may be a touchscreen or a keypad. Indeed, in certain embodiments, the user input panel 552 includes a plurality of buttons 554, which may be actual buttons or generated buttons on a touchscreen. The plurality of buttons 554 may each have respective numerals 556 and associated letters 558, which may facilitate the input of certain information relating to the operation of the HTC 16, various information relating to the customization of the HTC 16 or the interface 530, or the like. Generally, the user input panel 552 enables the user to input commands, make adjustments to operational modes, configure personalized readouts, program various modes, and so forth. Furthermore, the user input panel 552 may perform any one or a combination of the operations described above with regard to the input and monitoring features of the interface 530. For example, the user input panel 552 may enable a user to program the amount of flow provided to each hydraulic tool during operation, such as split ratios, modes with associated split ratios, and so forth. Furthermore, such programmability may also enable the user to select priority levels for each tool. For example, the user may assign the highest priority to the auxiliary tool (e.g., the hydraulic crane), with other tools, such as crimps, drills, saws, etc. being lower priority. The user may also input or adjust threshold pressures, threshold flow rates, or any similar input that enables the operation of the HTC 16 to be customized to the particular use of the end user. Indeed, the interface 530 may include any one or a combination of the features described herein, as may be determined based on spatial, cost, and/or logistical constraints.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a hydraulic supply system, comprising:
      a drive;
      a hydraulic pump coupled to the drive; and
      a hydraulic tool control unit coupled to an output of the hydraulic pump and configured to enable simultaneous use of multiple hydraulic tools, wherein the hydraulic tool control unit comprises:
         a first hydraulic output configured to supply a first flow of a hydraulic fluid from the hydraulic pump, through a first electronically actuated valve, and to a hydraulic lift;
         a second hydraulic output configured to supply a second flow of the hydraulic fluid from the hydraulic pump, through a second electronically actuated valve, and to a first hydraulic tool; and
      wherein the hydraulic tool control unit is configured to electronically adjust the first and second electronically actuated valves to adjust a first flow rate of the first flow and a second flow rate of the second flow, to calibrate an electronic input to the first and second electronically actuated valves versus a corresponding position of the first and second electronically actuated valves, and to calibrate the electronic input to the first and second electronically actuated valves based on at least one property of the hydraulic fluid.

2. The system of claim 1, wherein the hydraulic supply system comprises a service pack unit having the drive, the hydraulic pump, and the hydraulic tool control unit.

3. The system of claim 1, comprising a vehicle having the hydraulic supply system and the hydraulic lift, wherein the drive is a main engine of the vehicle.

4. The system of claim 1, wherein the hydraulic tool control unit is configured to electronically adjust the first or second electronically actuated valve to stabilize the first or second flow rate in response to a feedback indicative of a difference between a monitored flow rate versus a target flow rate.

5. The system of claim 1, wherein the hydraulic tool control unit comprises a third hydraulic output configured to supply a third flow of the hydraulic fluid from the hydraulic pump, through the first electronically actuated valve, and to a second hydraulic tool at a third flow rate.

6. The system of claim 5, wherein the hydraulic tool control unit is configured to electronically adjust the position of the first electronically actuated valve between a first and a second position, wherein the first electronically actuated valve, in the first position, is configured to supply the first flow to the hydraulic lift, and wherein the first electronically actuated valve, in the second position, is configured to supply the third flow to the second hydraulic tool.

7. The system of claim 6, wherein the position of the first electronically actuated valve is electronically adjustable between the first and second positions to provide a split flow of hydraulic fluid between the first and third flows.

8. The system of claim 7, wherein the split flow has a ratio of the first flow rate to the third flow rate of X:Y, wherein X and Y each range between 0 and 100.

9. The system of claim 1, comprising a user interface configured to enable a user to electronically adjust at least the first flow rate of the first flow and the second flow rate of the second flow.

10. A hydraulic tool control unit, comprising:
    a hydraulic input disposed in an housing and configured to couple to a hydraulic pump;
    a first hydraulic output disposed in the housing and configured to supply a first flow of a hydraulic fluid from the hydraulic pump, through a first electronically actuated valve, and to a first hydraulic tool; and
    a second hydraulic output disposed in the housing and configured to supply a second flow of the hydraulic fluid from the hydraulic pump, through a second electronically actuated valve, and to a second hydraulic tool,
    wherein the hydraulic tool control unit is configured to calibrate an electronic input to the first and second electronically actuated valves versus a corresponding position of the first and second electronically actuated valves, and to calibrate the electronic input to the first and second electronically actuated valves based on at least one property of the hydraulic fluid.

11. The hydraulic tool control unit of claim 10, comprising a third hydraulic output disposed in the housing configured to supply a third flow of the hydraulic fluid from the hydraulic pump, through the second electronically actuated valve, and to a third hydraulic tool at a third flow rate.

12. The hydraulic tool control unit of claim 11, wherein the hydraulic tool control unit is configured to electronically adjust the position of the second electronically actuated valve between a first and a second position, wherein the second electronically actuated valve, in the first position, is configured to supply the second flow to the second hydraulic tool, and wherein the second electronically actuated valve, in the second position, is configured to supply the third flow to the third hydraulic tool.

13. The hydraulic tool control unit of claim 12, wherein the hydraulic tool control unit is configured to electronically adjust the position of the second electronically actuated valve in response to a feedback indicative of a hydraulic load at any or a combination of the first hydraulic tool, the second hydraulic tool, or the third hydraulic tool, or in response to a user input provided via an electronic interface, or any combination thereof.

14. A system, comprising:
    a service pack unit, comprising:
       a drive;
       a hydraulic pump coupled to the drive;
       a hydraulic tool control unit coupled to an output of the hydraulic pump, wherein the hydraulic tool control unit comprises:
          a first hydraulic output configured to supply a first flow of a hydraulic fluid from the hydraulic pump to a first hydraulic tool;
          a second hydraulic output configured to supply a second flow of the hydraulic fluid from the hydraulic pump to a second hydraulic tool;
       wherein the hydraulic tool control unit comprises at least one electronically adjustable flow diverter valve, and wherein the at least one electronically adjustable flow diverter valve has a first valve position and a second valve position; and
       wherein the hydraulic tool control unit is configured to electronically adjust the at least one electronically adjustable flow diverter valve to adjust a first flow rate of the first flow or a second flow rate of the second flow, to enable simultaneous use of the first and second hydraulic tools, to calibrate an electronic input to the at least one electronically adjustable flow diverter valve versus a corresponding position of the at least one electronically adjustable flow diverter valve, and to calibrate the electronic input to the at least one electronically adjustable flow diverter valve based on at least one property of the hydraulic fluid.

15. The system of claim 14, wherein the electronically adjustable flow diverter valve, in the first valve position, is configured to supply the first flow to the first hydraulic tool, and wherein the electronically adjustable flow diverter valve, in the second valve position, is configured to supply the second flow to the second hydraulic tool.

16. The system of claim 15, wherein when the electronically adjustable flow diverter valve is configured to be electronically energized to move to the first valve position corresponding to no flow to the second hydraulic tool, and wherein the electronically adjustable flow diverter valve, while not electronically energized, is configured to move to the second valve position corresponding to no flow to the first hydraulic tool.

17. The system of claim 15, wherein the hydraulic tool control unit is configured to electronically adjust the position of the electronically adjustable flow diverter valve between the first and second valve positions to provide a split flow of hydraulic fluid between the first and second flows.

* * * * *